(12) United States Patent
Hidaka et al.

(10) Patent No.: US 8,156,513 B2
(45) Date of Patent: Apr. 10, 2012

(54) MOTOR AND STORAGE DISK DRIVE APPARATUS

(75) Inventors: Hidehiko Hidaka, Kyoto (JP); Shigeo Hayashi, Kyoto (JP); Hiroyuki Ichizaki, Kyoto (JP); Akihiro Nakagawa, Kyoto (JP); Tatsuya Tatara, Kyoto (JP); Harushige Osawa, Kyoto (JP); Atsushi Inoue, Kyoto (JP); Kazuya Ichimura, Kyoto (JP)

(73) Assignee: Nidec Corporation, Kyoto (JP)

( * ) Notice: Subject to any disclaimer, the term of this patent is extended or adjusted under 35 U.S.C. 154(b) by 27 days.

(21) Appl. No.: 12/858,903

(22) Filed: Aug. 18, 2010

(65) Prior Publication Data

US 2011/0047561 A1  Feb. 24, 2011

(30) Foreign Application Priority Data

Aug. 21, 2009  (JP) ................. 2009-191832
Aug. 21, 2009  (JP) ................. 2009-191833
May 18, 2010  (JP) ................. 2010-114620

(51) Int. Cl.
*G11B 19/20* (2006.01)
(52) U.S. Cl. ....................................... 720/695
(58) Field of Classification Search ............. 720/695, 720/702, 620, 697, 604, 700, 659, 667
See application file for complete search history.

(56) References Cited

U.S. PATENT DOCUMENTS

| 6,242,830 | B1 | 6/2001 | Katagiri |
| 6,339,273 | B1 | 1/2002 | Higuchi |
| 6,806,601 | B2 | 10/2004 | Miyamoto |
| 6,936,940 | B2 | 8/2005 | Kobayashi et al. |
| 6,961,949 | B2 * | 11/2005 | Horng et al. ............ 720/695 |
| 6,993,779 | B2 * | 1/2006 | Horng et al. ............ 720/695 |
| 2004/0135462 | A1 | 7/2004 | Masayuki |
| 2007/0274002 | A1 | 11/2007 | Kim et al. |
| 2008/0222668 | A1 | 9/2008 | Matsuda et al. |
| 2008/0278027 | A1 | 11/2008 | Ikemoto et al. |

FOREIGN PATENT DOCUMENTS

| JP | 3-048761 Y2 | 10/1991 |
| JP | 9-219961 A | 8/1997 |
| JP | 2000-113544 A | 4/2000 |
| JP | 2000-166171 A | 6/2000 |
| JP | 2000-270510 A | 9/2000 |
| JP | 2001-037141 A | 2/2001 |
| JP | 2002-197762 A | 7/2002 |
| JP | 2003-032932 A | 1/2003 |
| JP | 2003-052143 A | 2/2003 |
| JP | 2005-323420 A | 11/2005 |
| JP | 2006-196139 A | 7/2006 |
| JP | 2007-082368 A | 3/2007 |
| JP | 2007-185039 A | 7/2007 |
| KR | 10-0643936 B1 | 11/2006 |
| KR | 10-0832633 B1 | 5/2008 |

* cited by examiner

*Primary Examiner* — Allen Cao
(74) *Attorney, Agent, or Firm* — Westerman, Hattori, Daniels & Adrian, LLP

(57) ABSTRACT

A motor includes a bearing mechanism, a stationary unit including a stator arranged radially outwards of the bearing mechanism, and a rotary unit supported by the bearing mechanism at the upper side of the stationary unit for rotation about a center axis with respect to the stationary unit. The rotary unit includes a substantially cylindrical closed-top rotor yoke having a cover portion arranged to cover the stator. The bearing mechanism includes a substantially cylindrical closed-bottom bush formed by a press work, a sleeve fixed inside the bush and provided with an upper portion protruding beyond the bush and a shaft inserted into the sleeve. An upper end of the bush is lower than or flush with an upper end of the stator in a direction parallel to the center axis.

17 Claims, 25 Drawing Sheets

MOTOR AND STORAGE DISK DRIVE APPARATUS

BACKGROUND OF THE INVENTION

1. Field of the Invention

The present invention relates to an electric motor and a storage disk drive apparatus.

2. Description of the Related Art

Conventionally, there is known an electric motor in which a rotary unit is supported by a stationary unit through a sliding bearing.

In a low-profile motor, the size thereof is increased in the center axis direction if the motor is designed so that a pre-compression magnet can be arranged between a bush for holding a sleeve in place and a cylindrical closed-top rotor yoke positioned above the bush. In order for the sleeve to properly support a shaft, there is a need to sufficiently secure the bearing surface length of the sleeve and the shaft. In addition, a need exists to reduce the manufacturing cost of the motor.

SUMMARY OF THE INVENTION

One of principal purposes of the present invention is to prevent the size of a motor from increasing in the center axis direction even when a motor component is arranged between a bush and a cover portion of a rotor yoke.

In accordance with a first embodiment of the invention, there is provided a motor including: a bearing mechanism; a stationary unit including a stator arranged radially outwards of the bearing mechanism; and a rotary unit supported by the bearing mechanism at the upper side of the stationary unit for rotation about a center axis with respect to the stationary unit, wherein the rotary unit includes a substantially cylindrical closed-top rotor yoke having a cover portion arranged to cover the stator, the bearing mechanism including a substantially cylindrical closed-bottom bush formed by a press work, a sleeve fixed inside the bush and provided with an upper portion protruding beyond the bush and a shaft inserted into the sleeve, an upper end of the bush being lower than or flush with an upper end of the stator in a direction parallel to the center axis.

With the present invention, it is possible to prevent the size of a motor from increasing in the center axis direction even when a motor component is arranged between a bush and a cover portion of a rotor yoke.

Other features, elements, steps, characteristics and advantages of the present invention will become more apparent from the following detailed description of preferred embodiments of the present invention with reference to the attached drawings.

DETAILED DESCRIPTION OF THE INVENTION

In the subject specification, the upper side along the central axis J1 will be just referred to as "upper" and the lower side as "lower". However, the definitions "upper" and "lower" are not intended to designate the positional relationship or the orientation available when a motor is mounted to actual devices.

First Preferred Embodiment

Figure 1:
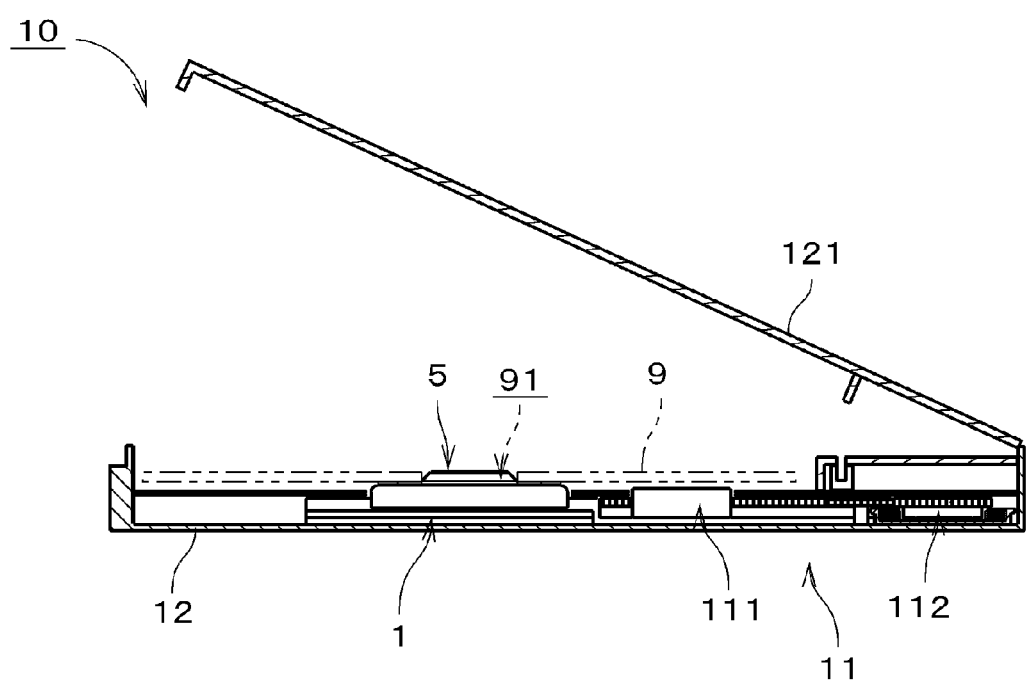
FIG. 1 is a section view showing a storage disk drive apparatus according to a first preferred embodiment.

FIG. 1 is a section view showing a storage disk drive apparatus according to a first preferred embodiment. The storage disk drive apparatus 10 preferably includes a motor 1, an access unit 11 and a box-shaped housing 12 arranged to accommodate the motor 1 and the access unit 11 therein. The motor 1 is of a slim type having a height of, e.g., from several millimeters to more than a dozen millimeters. In the motor 1, a chucking device 5 to be described below is fitted to the central hole 91 of a storage disk 9. The storage disk 9 is fixed in place by the chucking device 5. The access unit 11 preferably includes a head 111 and a head moving mechanism 112. The head 111 is an optical pickup mechanism arranged to perform a task of reading and/or writing information from/on the storage disk 9. A Blu-ray disk, for example, is used as the storage disk 9. Other kinds of optical disks may be used as the storage disk 9.

The head moving mechanism 112 serves to move the head 111 with respect to the motor 1 and the storage disk 9. The head 111 preferably includes a light-emitting portion and a light-receiving portion. The light-emitting portion emits laser light toward the lower surface of the storage disk 9. The light-receiving portion receives the light reflected from the storage disk 9. The housing 12 is provided in its upper portion with a cover 121 opened and closed when the storage disk 9 is put into and taken out from the storage disk drive apparatus 10. In the storage disk drive apparatus 10, the storage disk 9 is turned by the motor 1 and the head 111 is moved into a desired position by the head moving mechanism 112 to perform a task of reading and/or writing information from/on the storage disk 9.

Figure 2:
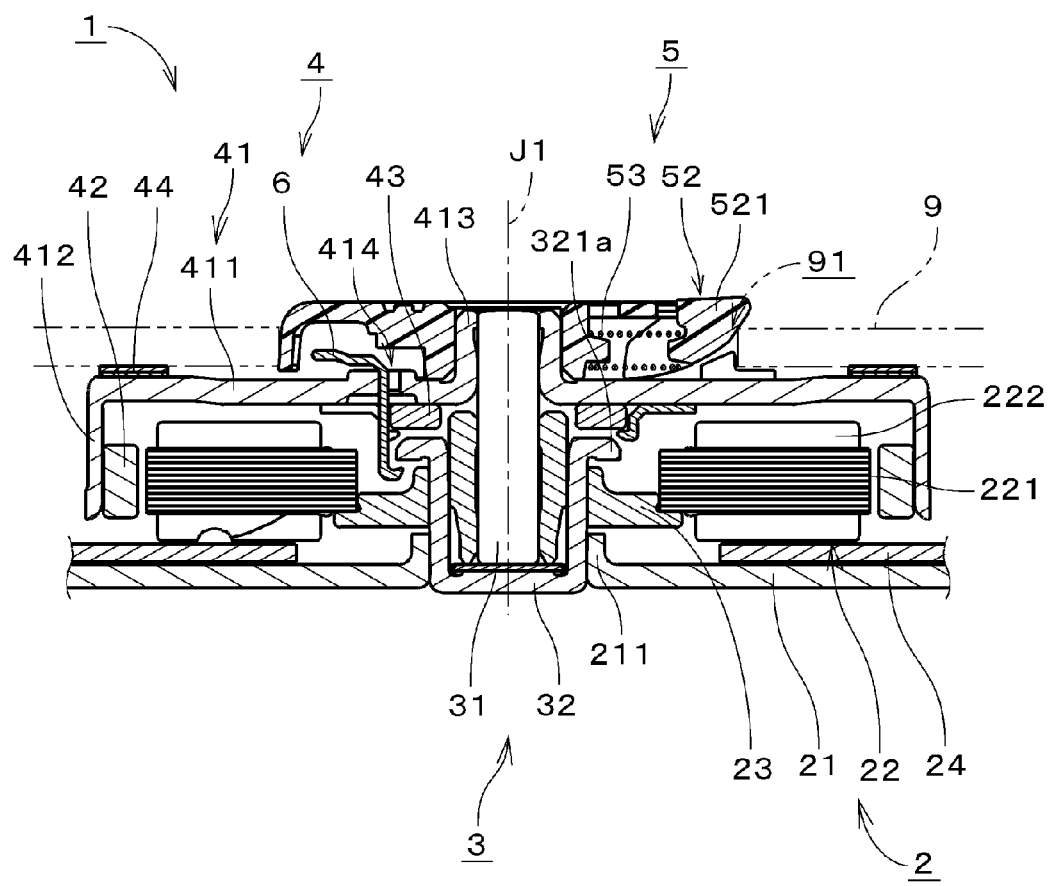
FIG. 2 is a section view showing a motor.

FIG. 2 is a vertical section view of the motor 1, in which view the storage disk 9 is indicated by double-dot chain lines. The motor 1 preferably includes a stationary unit 2 as a fixed assembly, a bearing mechanism 3, a rotary unit 4 as a rotating assembly, and a chucking device 5. The rotary unit 4 is positioned above the stationary unit 2 and the bearing mechanism 3 and is supported by the bearing mechanism 3 for rotation about the center axis J1 with respect to the stationary unit 2. The chucking device 5 is arranged above the rotary unit 4.

The stationary unit 2 preferably includes a substantially flat base portion 21, a stator 22, a ring-shaped stator holding member 23 and a circuit board 24. The base portion 21 is made of a metal. The base portion 21 is provided at its center with a cylindrical bearing holder 211. The bearing mechanism 3 is attached to the bearing holder 211. The stator 22 is arranged radially outwards of the bearing mechanism 3 and preferably includes a stator core 221 and a plurality of coils 222 formed in the stator core 221. The stator core 221 is formed of laminated steel plates. The circuit board 24 is arranged on the base portion 21. The stator holding member 23 is provided around the bearing mechanism 3 and positioned lower than the upper end of the stator 22. In the stationary unit 2, the stator core 221 is provided on the outer periphery of the stator holding member 23, as a result of which the stator 22 is indirectly fixed to the bearing mechanism 3.

Figure 3:
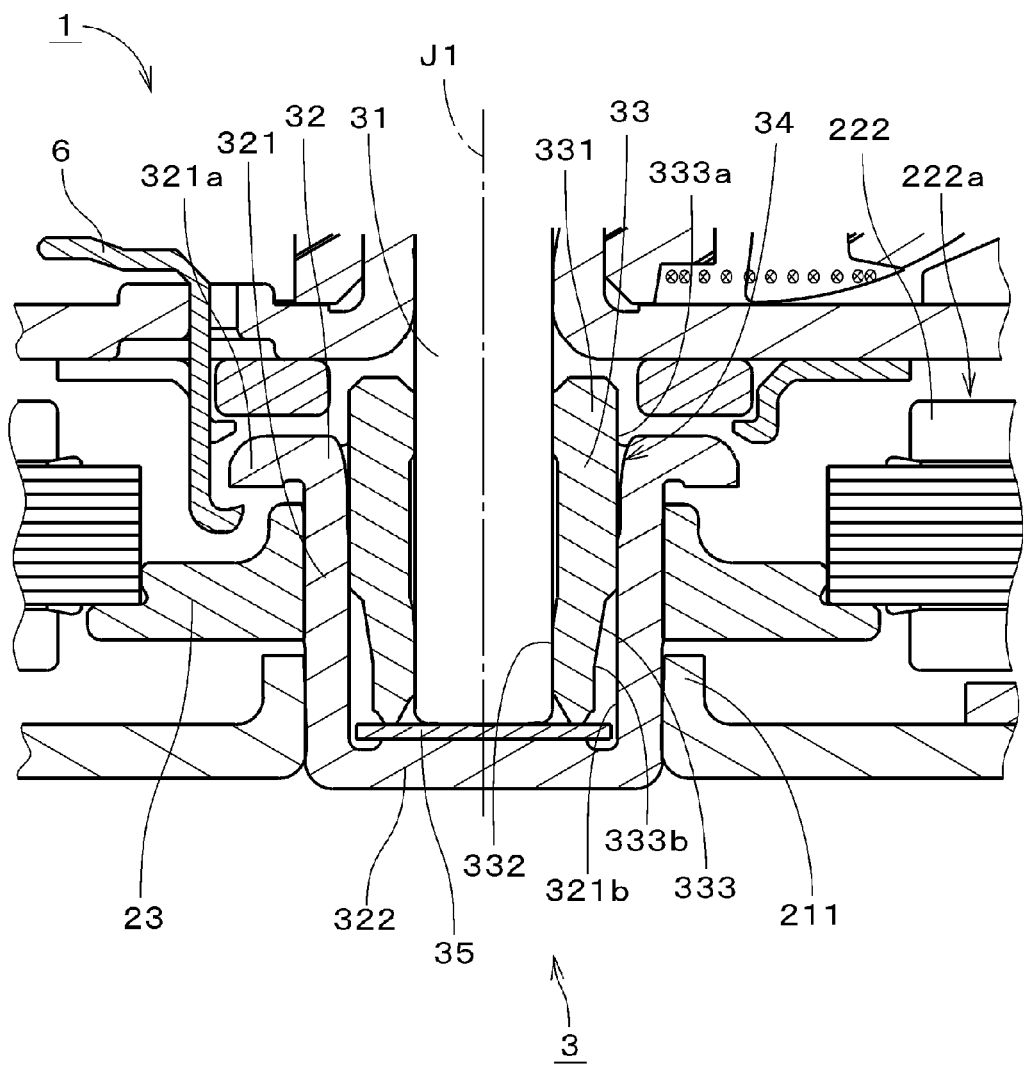
FIG. 3 is an enlarged section view of the motor.

FIG. 3 is a view showing the bearing mechanism 3 and its vicinities on an enlarged scale. The bearing mechanism 3 preferably includes a shaft 31, a substantially cylindrical closed-bottom bush 32, a sleeve 33 and a lubricant 34. The bush 32 is formed by subjecting a magnetic material to a press work. This makes it possible to produce the bush 32 in a cost-effective manner. The lower portion of the bush 32 is fixed to the inside of the bearing holder 211. The lubricant 34 is held inside the bush 32.

The bush 32 preferably includes a cylinder portion 321, the stator holding member 23 being attached to the outer surface of the cylinder portion 321. The cylinder portion 321 is provided in its upper portion with a flange portion protruding radially outwards about the center axis J1. The upper portion of the cylinder portion 321 will be referred to as "flange portion 321a" herein below. The flange portion 321a is formed by a drawing work, which makes it possible to secure great enough strength. The flange portion 321a of the bush 32, i.e., the upper end of the bush 32, is positioned lower than the upper ends 222a of the coils 222 in the direction parallel to the center axis J1. On the inner bottom surface of the bottom portion 322 of the bush 32, there is provided a disc-shaped thrust plate 35. The thrust plate 35 makes contact with the lower end of the sleeve 33 and is pressed against and fixed to the sleeve 33.

The sleeve 33 is made from a porous sintered metal body with an oil containing property and press-fitted to the inner surface 321b of the bush 32. The upper portion 331 of the sleeve 33 protrudes from the bush 32. The intermediate area of the inner surface 332 of the sleeve 33 is depressed outwards in the radial direction about the center axis J1 (hereinafter just referred to as "radially"). The lower area 333b of the outer surface 333 of the sleeve 33 is depressed radially inwards to leave a gap between the outer surface 333 and the inner surface 321b of the bush 32. Thus, the sleeve 33 has what is called an intermediate recess structure. The outer surface 333 corresponding to the depressed intermediate area of the inner surface 332 is partially press-fitted to the bush 32, while the upper portion 333a and the lower portion 333b of the outer surface 333 remain not press-fitted to the bush 32. This ensures that the sleeve 33 is fixed to the bush 32 with increased inner diameter accuracy.

In the motor 1, the lower end of the shaft 31 inserted into the sleeve 33 makes contact with the bottom portion 322 of the bush 32 through the thrust plate 35, thereby assuring stable support of the shaft 31 in the axial direction. The shaft 31 is radially supported by the sleeve 33 through the lubricant 34.

As shown in FIG. 2, the rotary unit 4 preferably includes a substantially cylindrical closed-top rotor yoke 41, a rotor magnet 42, a ring-shaped pre-compression magnet 43, an annular rubber piece 44 and an annular removal-preventing member 6. The rotor yoke 41 is made of a magnetic material and arranged to surround the stator 22. The rotor yoke 41 preferably includes a cover portion, a cylinder portion 412 and a cylindrical shaft-fixed portion 413. The cover portion serves as a disk mounting portion 411. The disk mounting portion 411 remains substantially perpendicular to the center axis J1 and extends radially beyond the chucking device 5. The disk mounting portion 411 preferably includes a plurality of through-holes 414 arranged along the circumferential direction (see FIG. 8). The annular rubber piece 44 is preferably arranged in the marginal area of the upper surface of the disk mounting portion 411. The storage disk is indirectly mounded on the disk mounting portion 411 through the annular rubber piece 44.

The cylinder portion 412 extends downwards from the outer periphery of the disk mounting portion 411. The rotor magnet 42 is attached to the inner surface of the cylinder portion 412. The rotor magnet 42 is opposed to the stator 22 in the direction perpendicular or substantially perpendicular to the center axis J1. When the motor 1 is driven, a magnetic action occurs between the rotor magnet 42 and the stator 22. The shaft-fixed portion 413 is provided at the center of the disk mounting portion 411. The upper portion of the shaft 31 is inserted into the shaft-fixed portion 413.

The pre-compression magnet 43 is arranged on the lower surface of the disk mounting portion 411 in an opposing relationship with the flange portion 321a of the bush 32 along the direction of the center axis J1. The pre-compression magnet 43 is magnetized with plural poles in the circumferential direction about the center axis J1 (hereinafter just referred to as "circumferentially"). This helps make the magnetic loop small and reduce the magnetic influence on other components, as compared with single pole magnetization.

In the rotary unit 4, the pre-compression magnet 43 is arranged near the flange portion 321a in an overlapping relationship with the flange portion 321a in the direction parallel or substantially parallel to the center axis J1. This ensures that a strong enough magnetic action occurs between the pre-compression magnet 43 and the bearing mechanism 3. The pre-compression magnet 43 is positioned radially inwards of the stator 22. This helps prevent occurrence of magnetic interference between the pre-compression magnet 43 and the stator 22. In the motor 1, the influence of the pre-compression magnet 43 on the electric characteristics of the stator 22 is reduced as compared with the case where the pre-compression magnet 43 is provided above the stator 22. The removal-preventing member 6 is provided in the disk mounting portion 411. The motor 1 has a structure in which the shaft 31 is easily removable from the sleeve 33 if the removal-preventing member 6 does not exist. Provision of the removal-preventing member 6 prevents the rotary unit 4 from being removed from the stationary unit 2. The removal-preventing member 6 can be readily formed by subjecting a metal plate to a press work.

The pre-compression magnet 43 is arranged in an axially overlapping relationship with the sleeve 33. This makes it possible to apply a pre-compression pressure to the rotary unit 4 without increasing the thickness of the motor 1.

Figure 4:
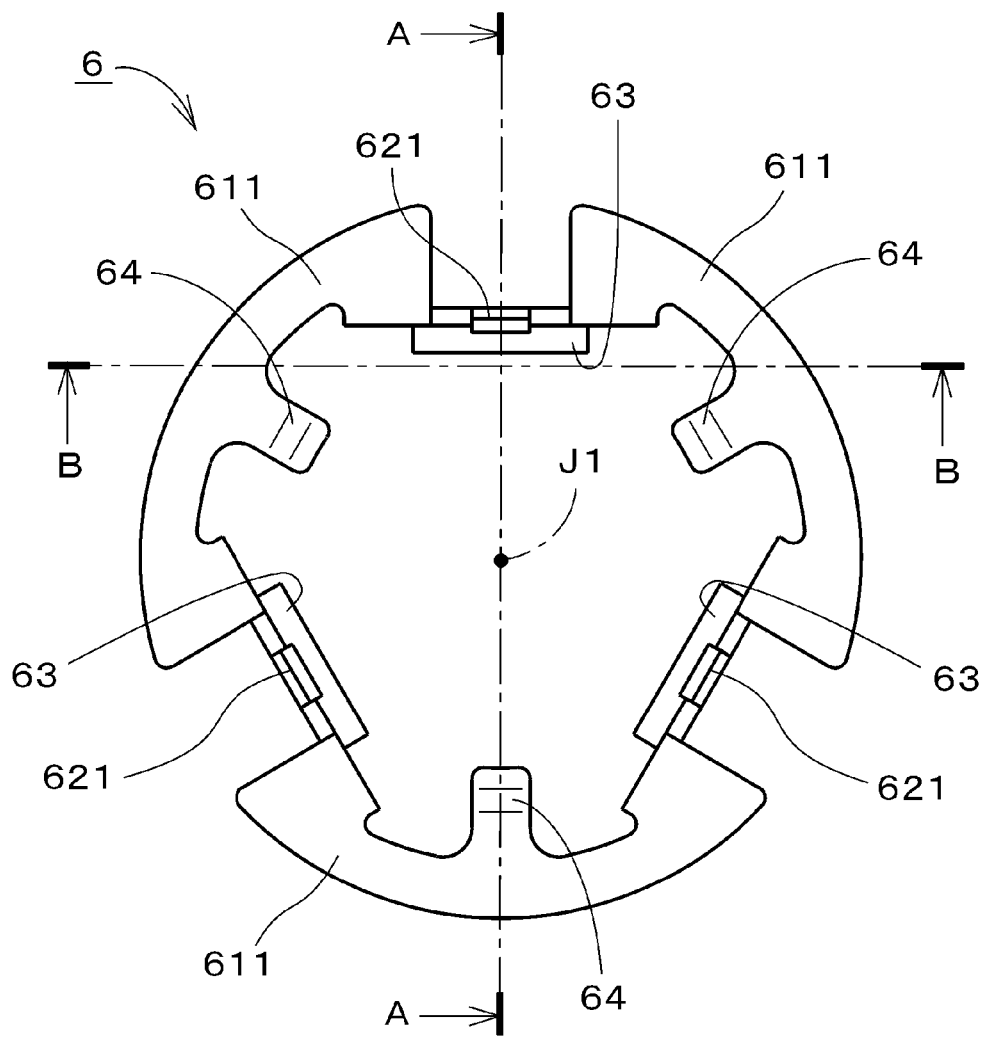
FIG. 4 is a plan view showing a removal-preventing member.
Figure 5:
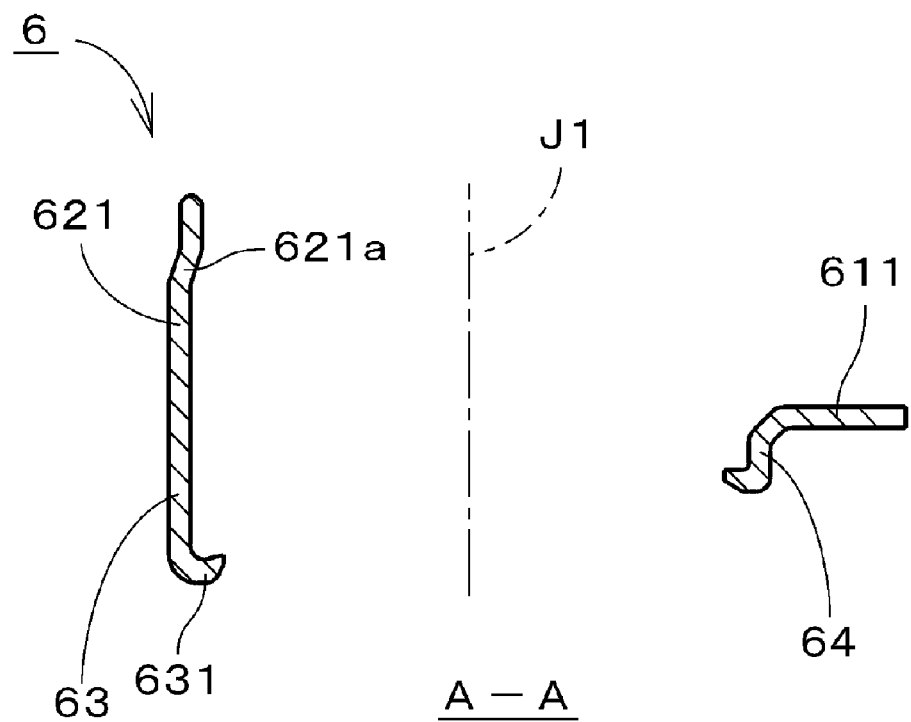
FIG. 5 is a section view of the removal-preventing member taken along line A-A in FIG. 4.
Figure 6:
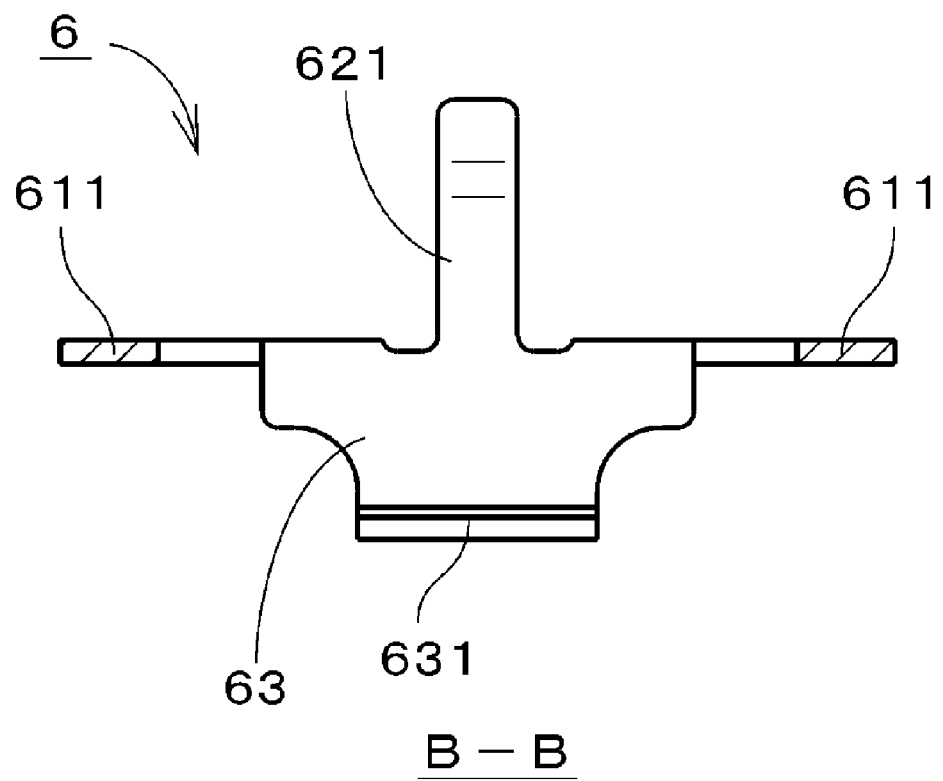
FIG. 6 is another section view of the removal-preventing member taken along line B-B in FIG. 4.

FIG. 4 is a plan view of the removal-preventing member 6. FIGS. 5 and 6 are section views of the removal-preventing member 6 taken along line A-A and line B-B, respectively, in FIG. 4. The inner shape of the removal-preventing member 6 is shown in FIG. 6. Referring to FIGS. 4 through 6, the removal-preventing member 6 preferably includes three arc-shaped contact portions 611 perpendicular or substantially perpendicular to the center axis J1, three upper protrusions 621, three lower protrusions 63 and three detachment-preventing portions 64 shown in FIGS. 4 and 5.

The upper protrusions 621 protrudes upwards beyond the contact portions 611. The lower protrusions 63 and the detachment-preventing portions 64 protrude downwards beyond the contact portions 611. In FIGS. 4 through 6, the upper protrusions 621 are illustrated to extend parallel to the center axis J1. However, as illustrated in FIG. 7, the upper protrusions 621 are bent toward the disk mounting portion 411 when the removal-preventing member 6 is fixed to the disk mounting portion 411.

As shown in FIG. 4, the contact portions 611 are circumferentially arranged in an equal interval. The upper protrusions 621 and the lower protrusions 63 are circumferentially provided between the contact portions 611 in an equal interval. The detachment-preventing portions 64 are circumferentially positioned between the lower protrusions 63. As can be seen in FIGS. 4 through 6, the upper protrusions 621 are arranged in the same circumferential positions as the lower protrusions 63. As shown in FIG. 5, each of the upper protrusions 621 is provided with a slant portion 621a inclined upwards and radially inwards.

Figure 7:
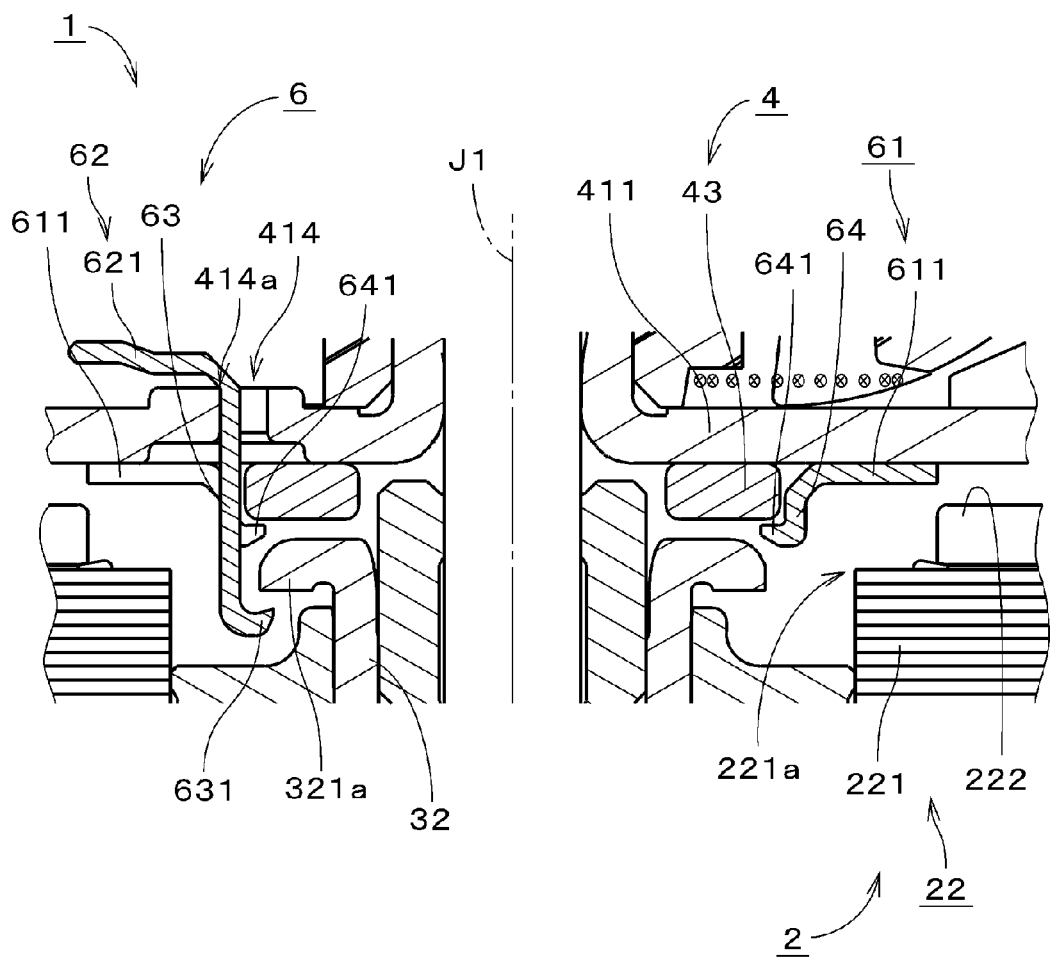
FIG. 7 is a section view showing a motor.

Referring to FIG. 7, the contact portions 611 of the removal-preventing member 6 make contact with the lower surface of the disk mounting portion 411 in the rotary unit 4. The upper protrusions 621 are inserted into the through-holes 414 of the disk mounting portion 411 and bent into contact with the upper surface of the disk mounting portion 411. More precisely, the upper protrusions 621 make contact with the upper edges 414a of the through-holes 414.

The disk mounting portion 411 is interposed between the contact portions 611 and the upper protrusions 621. Thus, the position of the removal-preventing member 6 relative to the disk mounting portion 411 is fixed in the direction parallel or substantially parallel to the center axis J1. Hereinafter, the three contact portions 611 are collectively referred to as "lower fixing portion 61" and the three upper protrusions 621 as "upper fixing portion 62". The lower fixing portion 61 is positioned radially inwards of the coils 222 of the stator 22. This makes it possible to secure the winding space of the coils 222 without increasing the size of the motor 1 in the direction of the center axis J1.

The lower protrusions 63 protrudes downwards from the lower surface of the disk mounting portion 411 and lies between the stator 22 and the bush 32. The tip end portions 631 of the lower protrusions 63 extend radially inwards and lie below and near the flange portion 321a. The tip end portions 631 are positioned radially inwards of the stator core 221 at an elevation lower than the upper end 221a of the stator core 221. In the motor 1, if a force acting away from the stationary unit 2 is applied to the rotary unit 4, the tip end portions 631 come into contact with the flange portion 321a, thereby preventing removal of the rotary unit 4 from the stationary unit 2. Hereinafter, the tip end portions 631 will be referred to as "removal-preventing portions 631".

The tip end portions 631 are arranged in an axially overlapping relationship with the upper portion of the stator holding member 23. This arrangement makes it possible to prevent the rotary unit 4 from being removed from the stationary unit 2 without limiting the magnetic space of the motor 1.

The tip end portions 641 of the detachment-preventing portions 64 are bent toward below the lower surface of the pre-compression magnet 43. In the present preferred embodiment, the pre-compression magnet 43 and the detachment-preventing portions 64 are spaced apart from each other by about 50 μm in the direction parallel or substantially parallel to the center axis J1 and in the radial direction. Alternatively, the pre-compression magnet 43 and the detachment-preventing portions 64 may come into contact with each other.

In the motor 1, even if the pre-compression magnet 43 gets away from the disk mounting portion 411 by an external force applied thereto, the pre-compression magnet makes contact with the tip end portions 641 of the detachment-preventing portions 64. Thus, the pre-compression magnet 43 is restrained from moving downwards. In this way, the simple structure using a portion of the removal-preventing member 6 can prevent detachment of the pre-compression magnet 43 with ease. In the motor 1, there is no need to additionally provide a component for preventing detachment of the pre-compression magnet 43, which assists in reducing the manufacturing cost.

The lower protrusions 63 and the detachment-preventing portions 64 of the removal-preventing member 6 are provided adjacent to the outer periphery of the pre-compression magnet 43. This simple structure restrains the radial outward movement of the pre-compression magnet 43 which would otherwise be caused by an external force applied to the pre-compression magnet 43. In the present preferred embodiment, the pre-compression magnet 43 and the lower protrusions 63 are slightly spaced apart from each other in the radial direction. However, the present invention is not limited thereto. The pre-compression magnet 43 and the lower protrusions 63 may remain in contact with each other.

Figure 8:
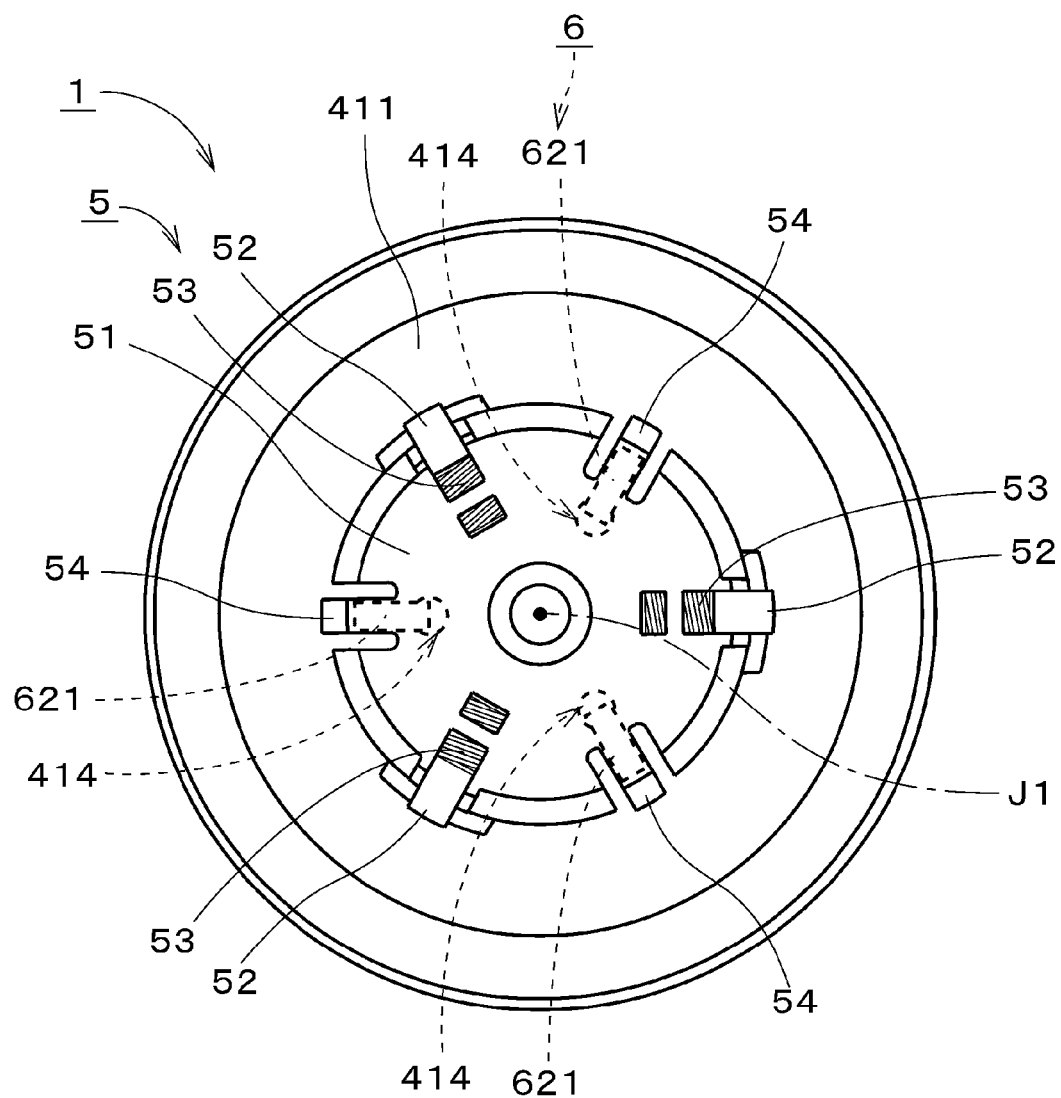
FIG. 8 is a plan view of the motor.

FIG. 8 is a plan view of the motor 1. In FIG. 8, the details of the chucking device 5 are omitted from illustration, the through-holes 414 of the disk mounting portion 411 and the upper protrusions 621 of the removal-preventing member 6 being indicated by broken lines. The chucking device 5 preferably includes a center case 51, three claw members 52, three coil springs 53 and three centering claws 54. The center case 51 has a hollow thick disc shape concentric with the center axis J1. The claw members 52 are arranged along the circumferential direction and protrude radially outwards from the center case 51. The through-holes 414 of the disk mounting portion 411 are positioned between the claw members 52 along the circumferential direction. The coil springs 53 are accommodated within the center case 51 to bias the claw members 52 radially outwards. In the motor 1, other resilient members such as rubber and the like may be used in place of the coil springs 53. Each of the centering claws 54 is arranged between two adjoining claw members 52.

Figure 9:
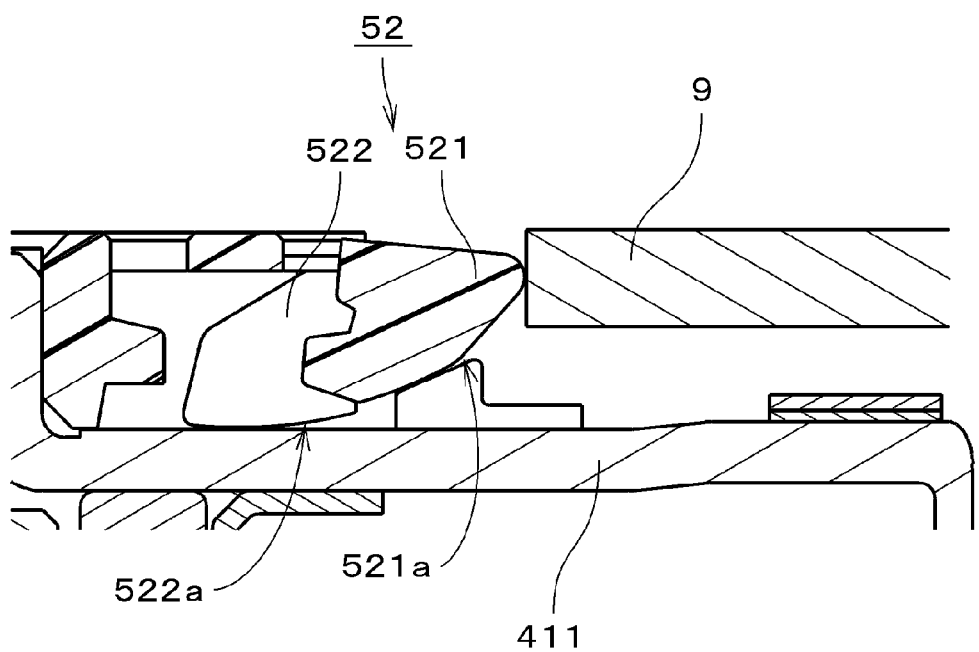
FIG. 9 is an enlarged section view of the motor.

Referring to FIG. 9, each of the claw members 52 preferably includes a claw body 521 and a pair of wing portions 522. The claw body 521 preferably includes a lower surface 521a inclined radially inwards and downwards. The wing portions 522 are provided at the circumferential opposite sides of the claw body 521. The lower surfaces 522a of the wing portions 522 are formed into a substantially cylindrical surface shape curved in the radial direction.

When the storage disk 9 is fixed on the disk mounting portion 411, it makes contact with the claw body 521 whereby the claw body 521 is slightly turned clockwise and moved radially inwards in FIG. 9. At this time, the lower surfaces 522a of the wing portions 522 make contact with the upper surface of the disk mounting portion 411 in a slidable manner. The storage disk 9 is mounted on the disk mounting portion 411 with its center aligned with the center axis J1 by the centering claws 54. At this moment, as shown in FIG. 2, the tip end of the claw body 521 is moved toward the upper side of the storage disk 9, and each of claw members 52 is pressed by the corresponding one of the coil springs 53 and moved back radially outwards. The claw members 52 make contact with the upper edge of the central hole 91 of the storage disk 9. As set forth above, the tip end of the claw body 521 of the chucking device 5 is movable in the vertical and radial directions. The storage disk 9 is biased radially outwards and downwards by the claw members 52 and eventually fixed on the disk mounting portion 411.

Next, the fabrication flow of the motor 1, particularly the fabrication flow of the rotary unit 4, will be described with reference to FIG. 10. As shown in FIG. 11, the parent piece 69 of the removal-preventing member 6 is formed by punching a metal plate with a press. The annular body portion of the parent piece 69 corresponds to the lower fixing portion 61 of the removal-preventing member 6. The portions protruding radially outwards from the body portion correspond to the upper protrusions 621. The portions lying radially inwards of the outwardly protruding portions correspond to the lower protrusions 63. The portions protruding radially inwards from the circumferential opposite sides of the outwardly protruding portions correspond to the detachment-preventing portions 64.

Hereinafter, the respective portions of the parent piece 69 will be designated by the same reference numerals as used in designating the corresponding portions of the removal-preventing member 6. Description will be made using the same names as given to the respective portions of the removal-preventing member 6.

First, the slant portion 621a shown in FIG. 5 is formed by slightly bending the intermediate extension of each of the upper protrusions 621. The tip end of each of the lower protrusions 63 is bent upwards to form each of the removal-preventing portions 631 shown in FIGS. 5 and 6. The tip end of each of the detachment-preventing portions 64 is also bent upwards.

Then, the lower protrusions 63 are bent downwards from the lower fixing portion 61 in the positions "65" between the lower protrusions 63 and the lower fixing portion 61. The portions corresponding to the positions designated by reference numeral "65" will be referred to as "bending portions 65" herein below. At this time, the upper protrusions 621 arranged in a radially adjoining relationship with the lower protrusions 63 are oriented upwards. The detachment-preventing portions 64 are bent downwards from the lower fixing portion 61 in the positions "66" between the detachment-preventing portions 64 and the lower fixing portion 61. The removal-preventing member 6 is formed through the aforementioned process flow (step S1).

Figure 12:
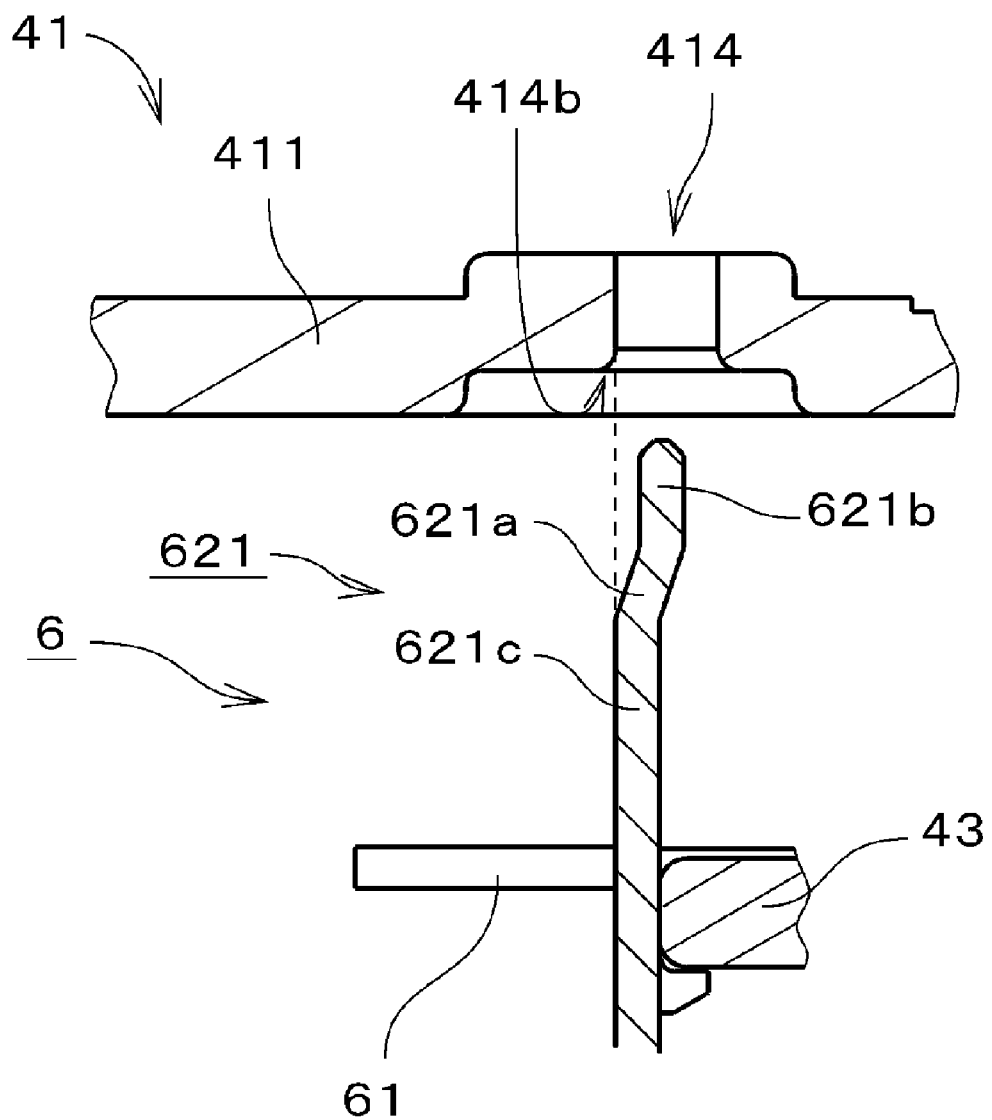
FIG. 12 is a section view showing the removal-preventing member and the disk mounting portion.

In parallel with the formation of the removal-preventing member 6, the rotor yoke 41 shown in FIG. 2 is formed by a press (step S2). At this time, as shown in FIG. 12, the upwardly-depressed recesses are formed in the disk mounting portion 411 of the rotor yoke 41 by a half-blanking work using a press. Furthermore, the through-holes 414 are formed by upwardly punching the bottom portions of the recesses. Alternatively, the formation of the through-holes 414 may precede the formation of the recesses. The cross section of the lower edge 414b of each of the through-holes 414 taken along the plane containing the center axis J1 has a smoothly curved convex shape, i.e., a substantially arc-like shape. Hereinafter, the edge 414b of each of the through-holes 414 will be referred to as "lower edge 414b".

Figure 13:
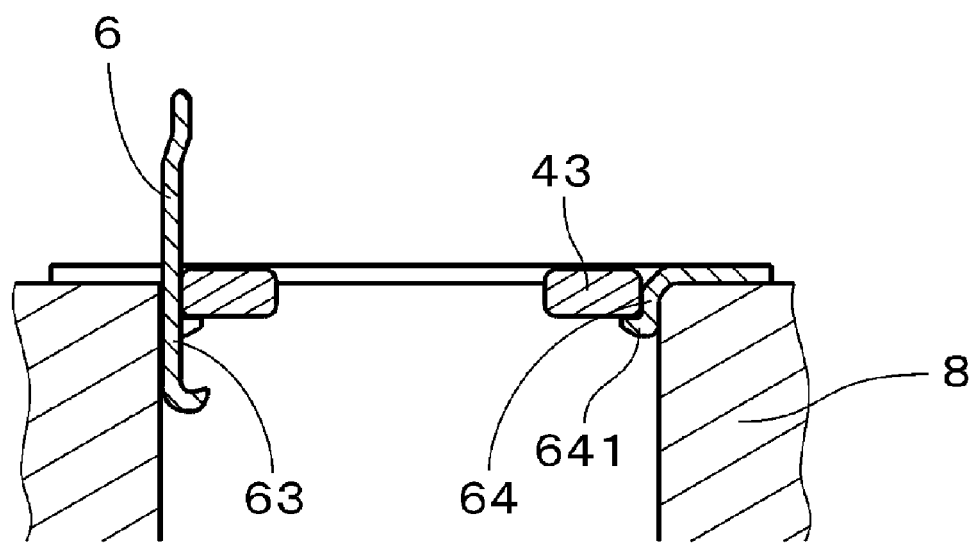
FIG. 13 is a section view showing the removal-preventing member and the pre-compression magnet.

Subsequently, as shown in FIG. 13, the lower protrusions 63 and the detachment-preventing portions 64 are inserted into the hole of a holding tool 8. Thereafter, the pre-compression magnet 43 is mounted to the tip ends 641 of the detachment-preventing portions 64 (step S3).

The upper protrusions 621 are inserted into the through-holes 414 of the disk mounting portion 411 as shown in FIG. 12 while keeping the relative position between the removal-preventing member 6 and the pre-compression magnet 43 substantially constant (step S4). When the upper protrusions 621 are seen in a plan view, the radial width of each of the upper protrusions 621 of the removal-preventing member 6, namely the radial width between the inner surface of the portion lying above the slant portion 621 (hereinafter called "tip end portion 621b") and the outer surface of the lower portion 621c lying below the slant portion 621a, is set smaller than the radial width of each of the through-holes 414. This makes it easy to insert the upper protrusions 621 into the through-holes 414.

In the course of insertion, the tip end portion 621b of each of the upper protrusions 621 is positioned substantially at the center of each of the through-holes 414. At least one of the slant portions 621a of the upper protrusions 621 makes slidable contact with the radial outer portion of the lower edge 414b of each of the through-holes 414, while the lower portion 621c comes into slidable contact with the radial outer portion of each of the through-holes 414.

If the fixing portion 61 makes contact with the lower surface of the disk mounting portion 411, the task of mounting the rotor yoke 41 on the removal-preventing member 6 comes to an end. The pre-compression magnet 43 comes into contact with the lower surface of the disk mounting portion 411 by the magnetic action.

Figure 14:
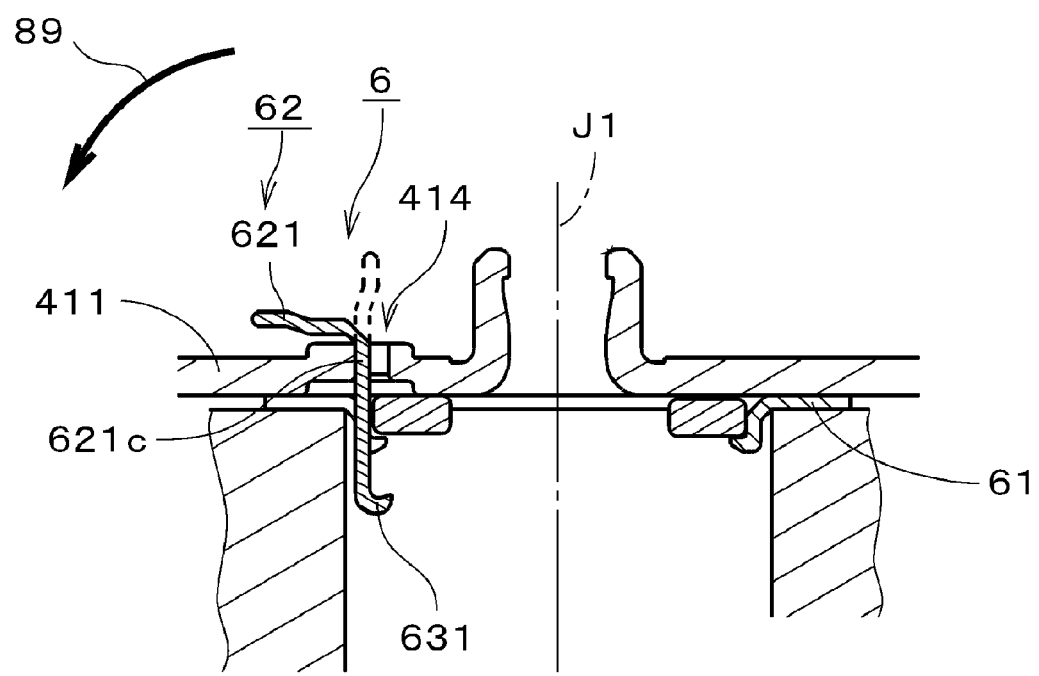
FIG. 14 is a section view of the rotary unit.

The upper protrusions 621 are bent radially outwards toward the upper surface of the disk mounting portion 411 as indicated by an arrow 89 in FIG. 14 so that the upper protrusions 621 can partially make contact with the upper surface of the disk mounting portion 411, more precisely the upper edges of the through-holes 414. Thus, the disk mounting portion 411 is arranged between the upper fixing portion 62, i.e., the upper protrusions 621, and the lower fixing portion 61. In this manner, the position of the removal-preventing member 6 relative to the disk mounting portion 411 is fixed in the direction parallel or substantially parallel to the center axis J1. As the outer surface of the lower portion 621c of each of the upper protrusions 621 makes contact with the radial outer portion of each of the through-holes 414, the position of the removal-preventing member 6 relative to the disk mounting portion 411 is fixed in the radial direction (step S5).

In the removal-preventing member 6, the circumferential width of each of the upper protrusions 621 shown in FIG. 11 is set smaller than the circumferential width of each of the bending portions 65. As a result, the force required in bending the upper protrusions 621 toward the upper surface of the disk mounting portion 411 becomes smaller than the force required in plastically deforming the bending portions 65. This prevents occurrence of a change in the orientation of the removal-preventing portions 631 (see FIG. 14) when fixing the removal-preventing member 6 in place.

In the rotor yoke 41, the annular rubber piece 44 and the rotor magnet 42 are respectively attached to the marginal area of the disk mounting portion 411 and cylinder portion 412 shown in FIG. 2, thereby completing the fabrication of the rotary unit 4. Alternatively, the attachment of the annular rubber piece 44 and the rotor magnet 42 may precede the attachment of the removal-preventing member 6 to the rotor yoke 41. Then, the chucking device 5 is attached to the disk mounting portion 411 as shown in FIG. 2 (step S6).

Figure 15:
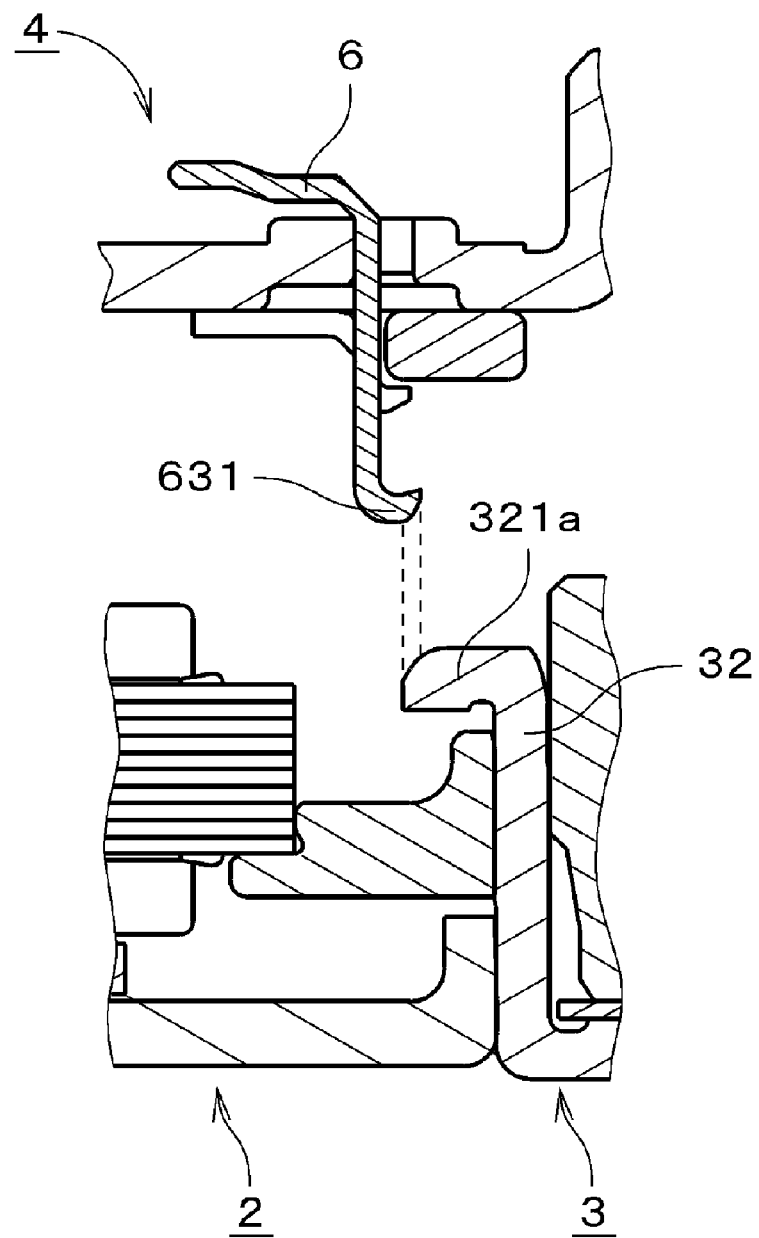
FIG. 15 is a section view of the rotary unit, the stationary unit and the bearing mechanism.

The stationary unit 2 and the bearing mechanism are fabricated independently of each other, after which the bearing mechanism 3 is attached to the stationary unit 2. As shown in FIG. 15, the rotary unit 4 is arranged above the bearing mechanism 3 so that the removal-preventing portions 631 of the removal-preventing member 6 and the flange portion 321a of the bush 32 can be in a vertically opposing relationship with each other.

The rotary unit 4 is moved down toward the bearing mechanism 3 so that the removal-preventing portions 631 can make contact with the flange portion 321a. The removal-preventing portions 631 are elastically deformed and then returned to the original shape as the rotary unit 4 is further moved down. Consequently, the removal-preventing portions 631 are positioned below and near the flange portion 321a.

In this manner, the rotary unit 4 and the stationary unit 2 are assembled together through the bearing mechanism 3 (step S7).

As set forth above, the upper fixing portion 62 is brought into contact with the upper edges of the through-holes 414 by a caulking work, while bringing the lower fixing portion 61 into contact with the lower surface of the disk mounting portion 411 of the motor 1. This makes it possible to easily and strongly fix the removal-preventing member 6 to the disk mounting portion 411 through the use of a simple structure. As a consequence, it becomes possible to easily realize automated manufacture of the motor 1. Since the removal-preventing member 6 is strongly fixed in place by a caulking work, it is possible to prevent the removal-preventing member 6 from getting loosened with respect to the rotor yoke 41. The annular shape of the removal-preventing member 6 assures easier handling of the removal-preventing member 6 when fixing the same to the disk mounting portion 411.

Since the upper fixing portion 62 and the lower fixing portion 61 are all oriented radially outwards, it is possible to more strongly fix the removal-preventing member 6 to the disk mounting portion 411.

Inasmuch as the upper protrusions 621 are provided circumferentially between the claw members 52 of the chucking device 5 in the rotary unit 4, the claw members 52 making slidable contact with the upper surface of the disk mounting portion 411 are prevented from undergoing physical interference with the upper protrusions 621 during the course of mounting the storage disk 9. In the motor 1, therefore, there is no need to take into account the physical interference between the claw members 52 and the removal-preventing member 6. This makes it easy to design the motor 1 and prevents the size of the chucking device 5 from increasing in the direction of the center axis J1. The stator 22 is fixed to the bush 32 through the stator holding member 23. This helps simplify the shape of the stator core 221 as compared with the case where the stator core 221 is directly fixed to the bush 32.

In the motor 1, the flange portion 321a is positioned lower than the upper ends 222a of the coils 222. Thanks to this feature, the pre-compression magnet 43 can be provided between the bush 32 and the disk mounting portion 411 without having to increase the size of the motor 1 in the direction of the center axis J1. The magnetic action of the pre-compression magnet 43 on the flange portion 321a eliminates the need to additionally provide a magnetic member in the bearing mechanism 3, which assists in reducing the number of components. In the rotary unit 4, the pre-compression magnet 43 is provided in the rotor yoke 41 with no use of an adhesive agent. This makes it easy to automate the manufacture of the motor 1. In the bearing mechanism 3, the upper portion 331 of the sleeve 33 protrudes upwards beyond the bush 32. This assists in securing the distance between the upper and lower ends of the inner surface 332, i.e., the bearing surface, of the sleeve 33.

In the first preferred embodiment, the detachment-preventing portions 64 are provided between the lower protrusions 63 in the circumferential direction. This makes it possible to easily and accurately form the detachment-preventing portions 64 as compared with the case where detachment-preventing portions are provided in the lower protrusions 63. As mentioned above, each of the upper protrusions 621 is provided with the slant portion 621a, and the radial width of each of the through-holes 414 of the disk mounting portion 411 is greater than the radial width of each of the upper protrusions 621. This ensures that the upper protrusions 621 are easily inserted into the through-holes 414 even if the upper protrusions 621 and the through-holes 414 are slightly misaligned in the direction parallel to the center axis J1 during the course of fixing the removal-preventing member 6 to the disk mounting portion 411.

The cross section of the lower edge 414b of each of the through-holes 414 has a smoothly curved shape. In other words, the lower edge 414b is smoothly curved toward the inner side of each of the through-holes 414. This makes it possible to increase the permissible misalignment amount of the upper protrusions 621 relative to the through-holes 414 when the upper protrusions 621 of the removal-preventing member 6 are inserted into the through-holes 414, which means that the upper protrusions 621 can be easily inserted into the through-holes 414. As a result, the automated manufacture of the motor 1 can be realized in an easier manner.

In the stationary unit 2, the stator holding member 23 is positioned lower than the upper end of the stator 22, namely the upper ends 222a of the coils 222, in the direction parallel or substantially parallel to the center axis J1. Thanks to this feature, it is possible to sufficiently secure the length of the lower protrusions 63 that extend toward the stator holding member 23. This makes it possible to insert the removal-preventing portions 631 into the lower side of the flange portion 321a while sufficiently bending the lower protrusions 63 during the course of assembling the rotary unit 4 and the stationary unit 2 together. The removal-preventing portions 631 of the removal-preventing member 6 are positioned lower than the upper end of the stator 22 in between the stator 22 and the bush 32. This makes it possible to perform removal prevention without increasing the size of the motor 1.

In the motor 1, the removal-preventing member 6 is fixed to the disk mounting portion 411 with no use of an adhesive agent, which assists in reducing the number of fabrication steps of the motor 1. As compared with a method of fixing the removal-preventing member 6 by welding, it is possible to prevent scattering of granular molten metal called welding balls, which would occur in a welding process. In addition, there is no need to inspect the presence or absence of welding balls through visual examination.

As compared with a motor of the type in which removal prevention is performed within a bearing mechanism, the motor 1 makes it unnecessary to perform the machining of the shaft or the bush, which would otherwise be required to attach the removal-preventing member. This leads to a reduction in the manufacturing cost and helps prevent the axial length of the sleeve from becoming short.

Second Preferred Embodiment

Figure 16:
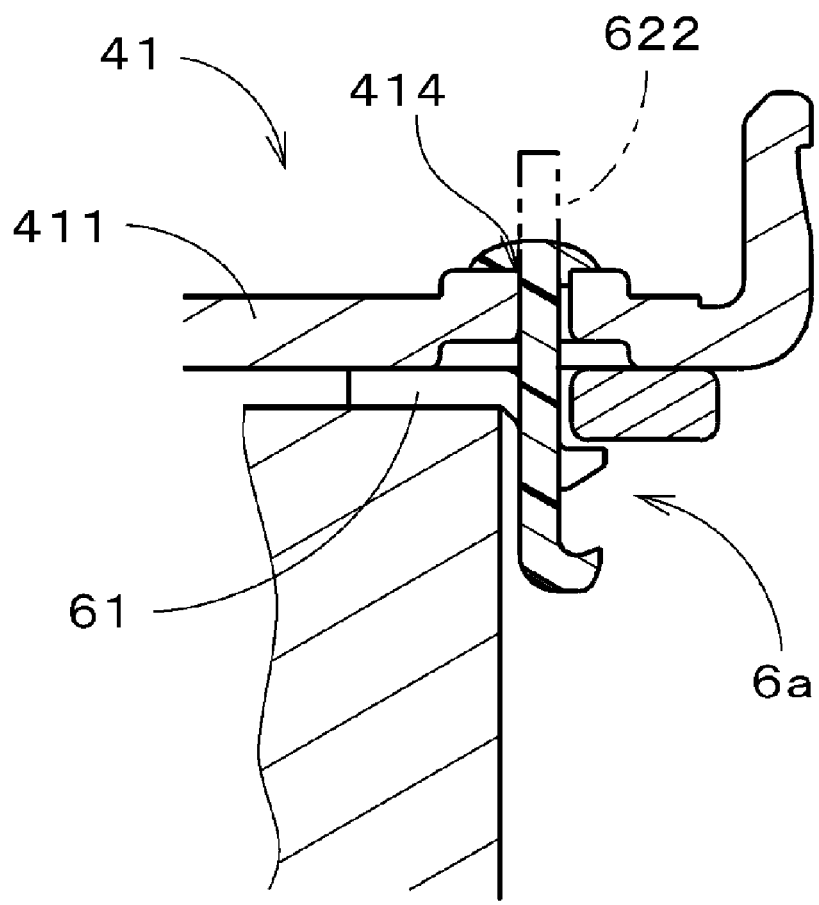
FIG. 16 is a section view showing the rotary unit of a motor according to a second preferred embodiment.

FIG. 16 is a view illustrating the task of fixing a removal-preventing member to a rotor yoke in a motor according to a second preferred embodiment. The motor of the second preferred embodiment preferably includes a removal-preventing member 6a made of a resin. The removal-preventing member 6a is provided with three rod-shaped upper protrusions 622 in place of the upper protrusions 622 of the removal-preventing member 6 shown in FIGS. 4 through 6. In FIG. 16, one of the upper protrusions 622 is indicated by a double-dot chain line. The shape of the remaining portions of the removal-preventing member 6a is the same as that of the removal-preventing member 6 of the first preferred embodiment. Other structures of the motor of the second preferred embodiment remain the same as those of the motor 1 shown in FIG. 2. Hereinafter, description will be made by designating the same components or portions with like reference numerals.

Figure 10:
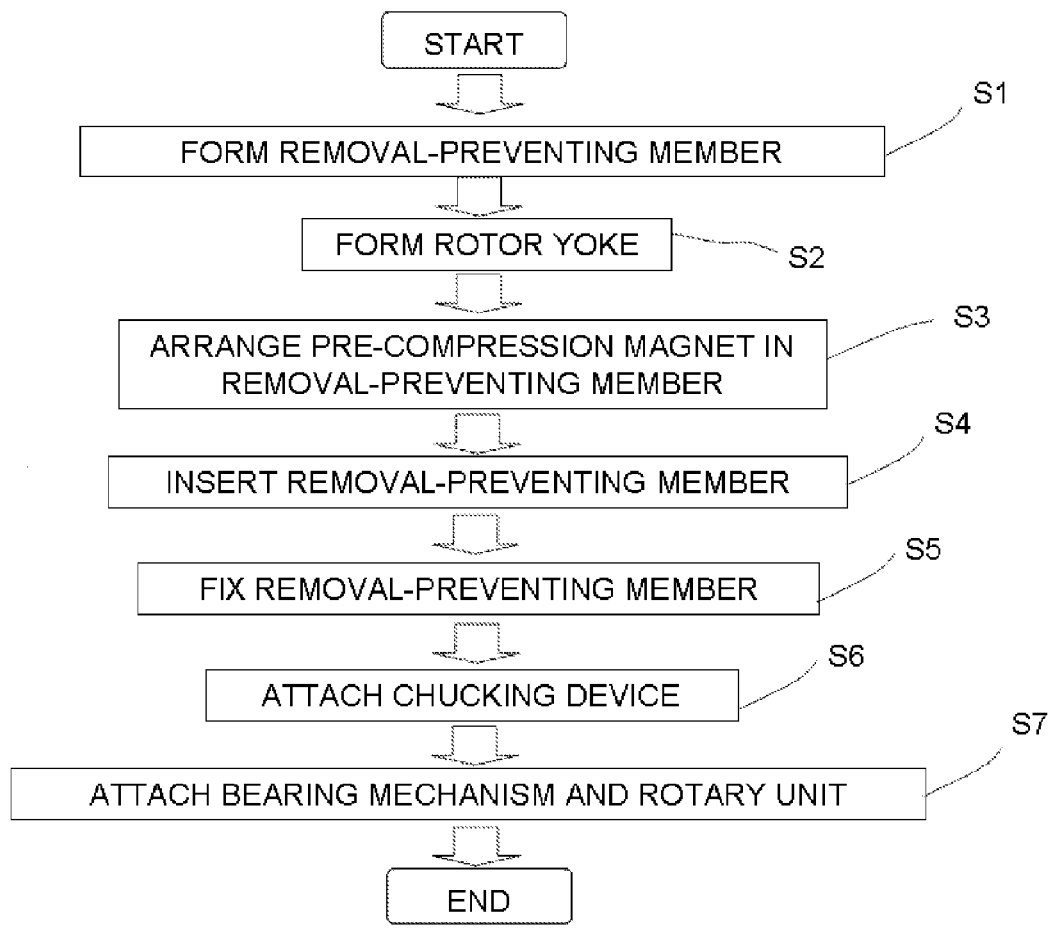
FIG. 10 is a view illustrating the fabrication flow of a motor.
Figure 11:
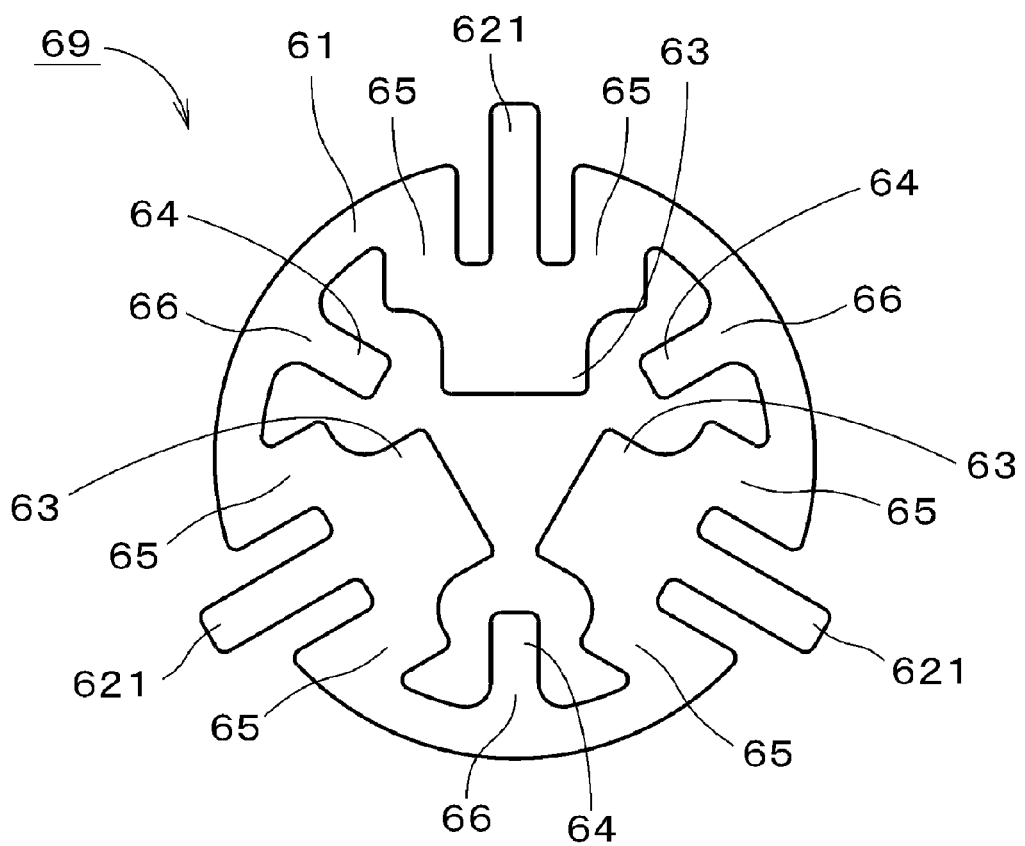
FIG. 11 is a plan view showing the parent piece of a removal-preventing member.

In order to fabricate the motor, the removal-preventing member 6a is first formed by introducing a molten resin into the cavity defined by molds (step S1 in FIG. 10). In parallel with the formation of the removal-preventing member 6a, the rotor yoke 41 is formed by a press (step S2). At this time, circular through-holes are formed in the rotor yoke 41 by upwardly punching the rotor yoke 41. Subsequently, as shown in FIG. 13, the pre-compression magnet 43 is mounted on the inner side of the removal-preventing member 6a while holding the removal-preventing member 6a with a holding tool 8 (step S3).

As shown in FIG. 16, the upper protrusions 622 of the removal-preventing member 6a are inserted into the through-holes 414 of the disk mounting portion 411 (step S4) so that the lower fixing portion 61 can make contact with the lower surface of the disk mounting portion 411. The upper protrusions 622 are heated and crushed against the upper surface of the disk mounting portion 411. The molten portions of the upper protrusions 622 come into contact with the upper surface of the disk mounting portion 411. Thus, the position of the removal-preventing member 6a relative to the disk mounting portion 411 is fixed in the direction parallel or substantially parallel to the center axis J1. Moreover, the upper protrusions 622 radially make contact with the radial inner or outer portions of the inner surfaces of the through-holes 414, thereby fixing the radial position of the removal-preventing member 6a relative to the disk mounting portion 411 (step S5).

Thereafter, the chucking device 5 shown in FIG. 8 is attached to the disk mounting portion 411 (step S6). In the rotary unit 4, the through-holes 414 of the disk mounting portion 411 are circumferentially positioned between the claw members 52 of the chucking device 5.

The stationary unit 2 and the bearing mechanism are fabricated independently of each other, after which the bearing mechanism 3 is attached to the stationary unit 2. As shown in FIG. 15, the rotary unit 4 is moved toward the bearing mechanism 3 with the removal-preventing portions 631 of the removal-preventing member 6a and the flange portion 321a of the bush 32 kept in a vertically opposing relationship with each other. The removal-preventing portions 631 are elastically deformed if they make contact with the flange portion 321a. The rotary unit 4 is further moved down and the removal-preventing portions 631 are returned to the original shape. Consequently, the removal-preventing portions 631 are positioned below and near the flange portion 321a.

In this manner, the rotary unit 4 and the stationary unit 2 are assembled together through the bearing mechanism 3 (step S7).

In the second preferred embodiment, the lower fixing portion 61 is brought into contact with the lower surface of the disk mounting portion 411, while bringing the upper fixing portion 62 into contact with the upper surface of the disk mounting portion 411 by a so-called resin weld caulking work. This makes it possible to easily and strongly fix the removal-preventing member 6a to the disk mounting portion 411 through the use of a simple structure. As a consequence, it becomes possible to easily realize automated manufacture of the motor.

Third Preferred Embodiment

Figure 17:
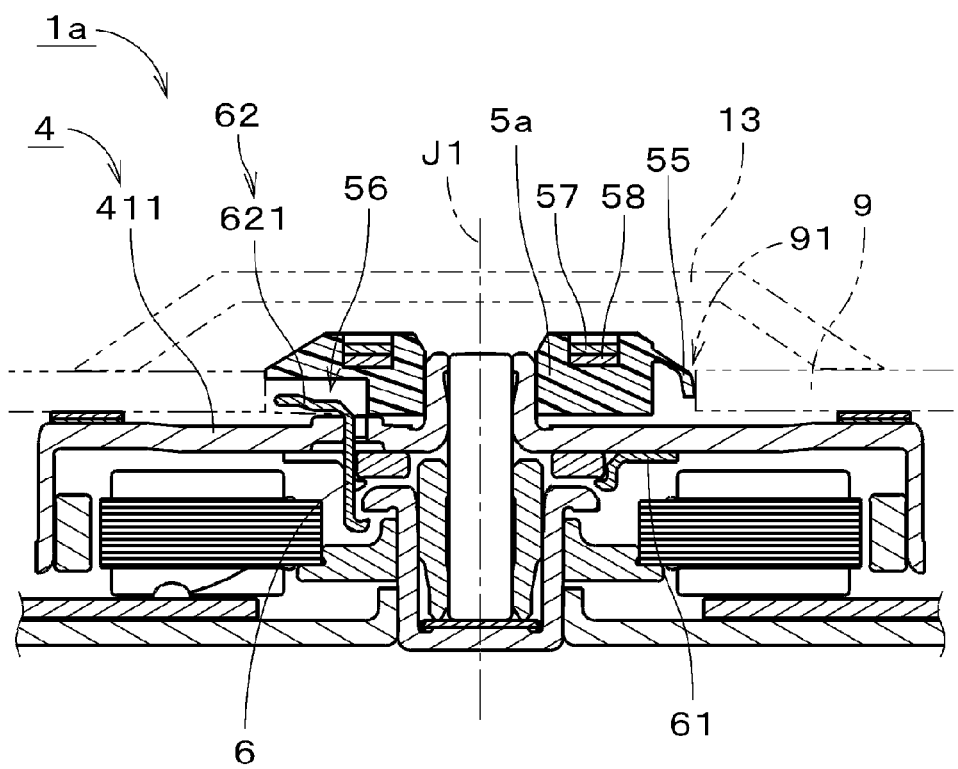
FIG. 17 is a section view showing a motor according to a third preferred embodiment.

FIG. 17 is a view showing a motor 1a according to a third preferred embodiment. In the storage disk drive apparatus provided with the motor 1a, the storage disk 9 is loaded into and taken out from an apparatus housing in a state that the storage disk 9 is placed on a movable tray provided in the apparatus housing.

A disk holder 5a formed by, e.g., injection-molding a resin is arranged at the center of the motor 1a above the disk mounting portion 411. The disk holder 5a preferably includes a plurality of claws 55 extending downwards from the upper periphery thereof. Cutout portions 56 are provided on the lower surface of the disk holder 5a between the claws 55 along the circumferential direction. A clamp magnet 57 and a clamp yoke 58 are attached to the disk holder 5a. In the rotary unit 4, the upper protrusions 622 of the removal-preventing member 6 are provided in such positions as to overlap with the cutout portion 56 in the direction parallel or substantially parallel to the center axis J1. Other structures of the motor 1a remain the same as the corresponding structures of the motor 1 shown in FIG. 2.

If the storage disk 9 is loaded into the storage disk drive apparatus, the central hole 91 of the storage disk 9 is positioned above the disk holder 5a of the motor 1a. In this state, the motor 1a is moved up so that the disk holder 5a can be fitted to the central hole 91 of the storage disk 9. The storage disk 9 is clamped between the disk mounting portion 411 and the clamper 13 under the action of the clamp magnet 57. At this time, the central hole 91 of the storage disk 9 comes into contact with the claws 55, as a result of which the claws 55 are elastically deformed radially inwards. The disk holder 5a can accurately align the center of the storage disk 9 with the center axis J1 using the elastic deformation of the claws 55.

In the motor 1a, the upper fixing portion 62 is brought into contact with the upper surface of the disk mounting portion 411 by a caulking work, while bringing the lower fixing portion 61 into contact with the lower surface of the disk mounting portion 411. This makes it possible to easily and strongly fix the removal-preventing member 6 to the disk mounting portion 411 through the use of a simple structure. The removal-preventing member 6 may have the same structure as described in respect of the second preferred embodiment.

Fourth Preferred Embodiment

Figure 18:
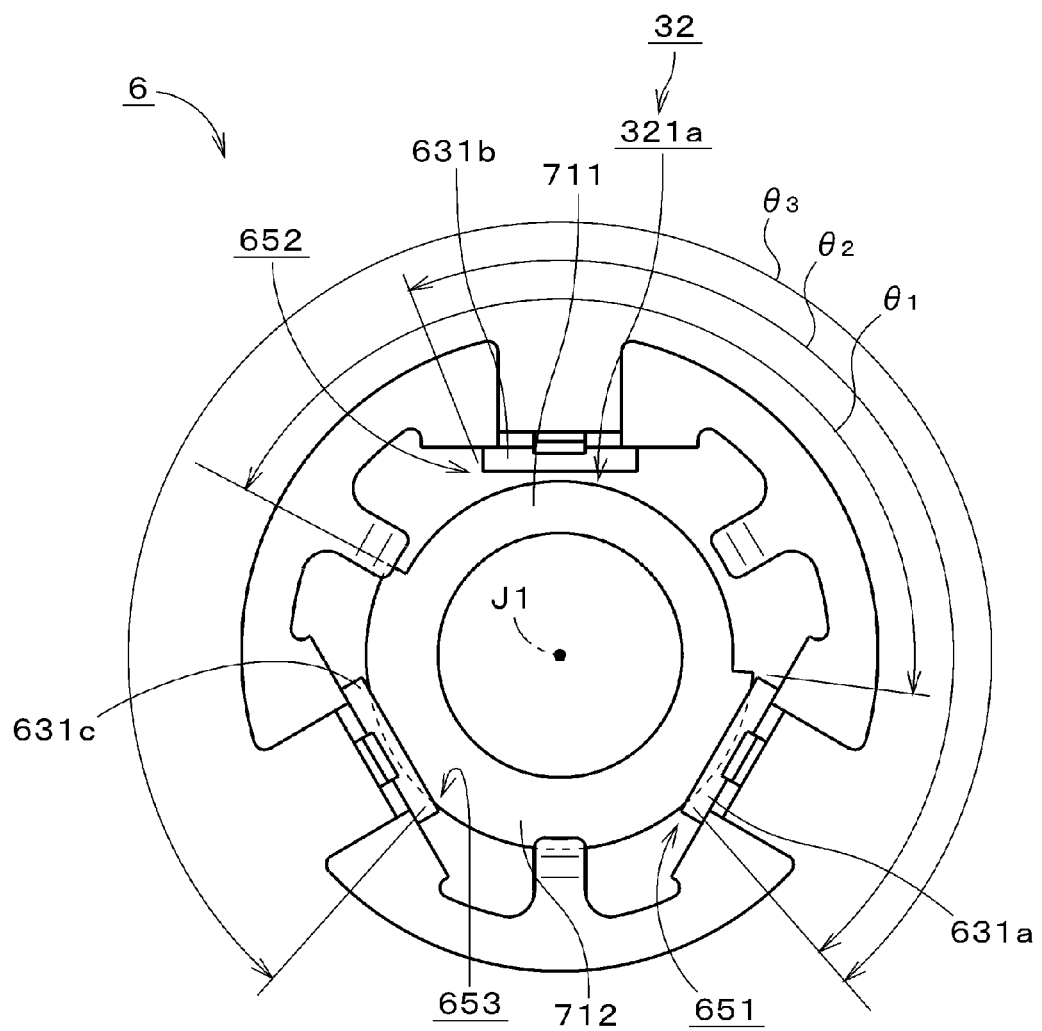
FIG. 18 is a plan view showing the rotor yoke of a motor according to a fourth preferred embodiment.

FIG. 18 is a plan view of the removal-preventing member 6 and the flange portion 321a employed in a motor according to a fourth preferred embodiment. The flange portion 321a preferably includes an extension 711 having a reduced radial width, which will be referred to as "reduced width extension 711" herein below. The flange portion 321a further includes an extension having a radial width greater than that of the reduced width extension 711, will be referred to as "increased width extension 712" herein below. Due to the provision of the reduced width extension 711, the shape of the flange portion 321a as seen in a plan view is asymmetrical with respect to the center axis J1.

The radius of the radial outer edge of the reduced width extension 711 is smaller than the distance between the center axis J1 and the tip end of each of the removal-preventing portions 631. Other shapes of the bush 32 remain the same as the shapes of the bush 32 employed in the motor 1 according to the first preferred embodiment. Other structures of the motor are also the same as the corresponding structures of the motor 1. In the following description, the three removal-preventing portions 631 will be distinguished from one another by naming them as "first removal-preventing portion 631a", "second removal-preventing portion 631b" and "third removal-preventing portion 631c" in the counterclockwise order from the right lower one in FIG. 18.

The angle $\theta_1$ of the circumferential extent of the reduced width extension 711 about the center axis J1 (hereinafter just referred to as "the angle $\theta_1$ of the reduced width extension 711") is greater than the counterclockwise angle $\theta_2$ about the center axis J1 running from the tip end 651 of the first removal-preventing portion 631a near the third removal-preventing portion 631c to the tip end 652 of the second removal-preventing portion 631b near the third removal-preventing portion 631c. More precisely, the tip end 651 of the first removal-preventing portion 631a near the third removal-preventing portion 631c signifies the tip end 651 of the first removal-preventing portion 631a overlapping with the increased width extension 712. This holds true in case of the tip end 652 of the second removal-preventing portion 631b near the third removal-preventing portion 631c.

The angle $\theta_1$ of the reduced width extension 711 is smaller than the counterclockwise angle $\theta_3$ about the center axis J1 running from the tip end 651 of the first removal-preventing portion 631a near the third removal-preventing portion 631c to the tip end 653 of the third removal-preventing portion 631c near the first removal-preventing portion 631a. If the angle $\theta_1$ of the reduced width extension 711 falls within the afore-mentioned range, one of the first through third removal-preventing portions 631a, 631b and 631c exists outside the reduced width extension 711 at all times during rotation of the motor 1. At least a portion of each of the remaining two of the removal-preventing portions 631a, 631b and 631c is positioned below the increased width extension 712 in the direction parallel or substantially parallel to the center axis J1.

Figure 19:
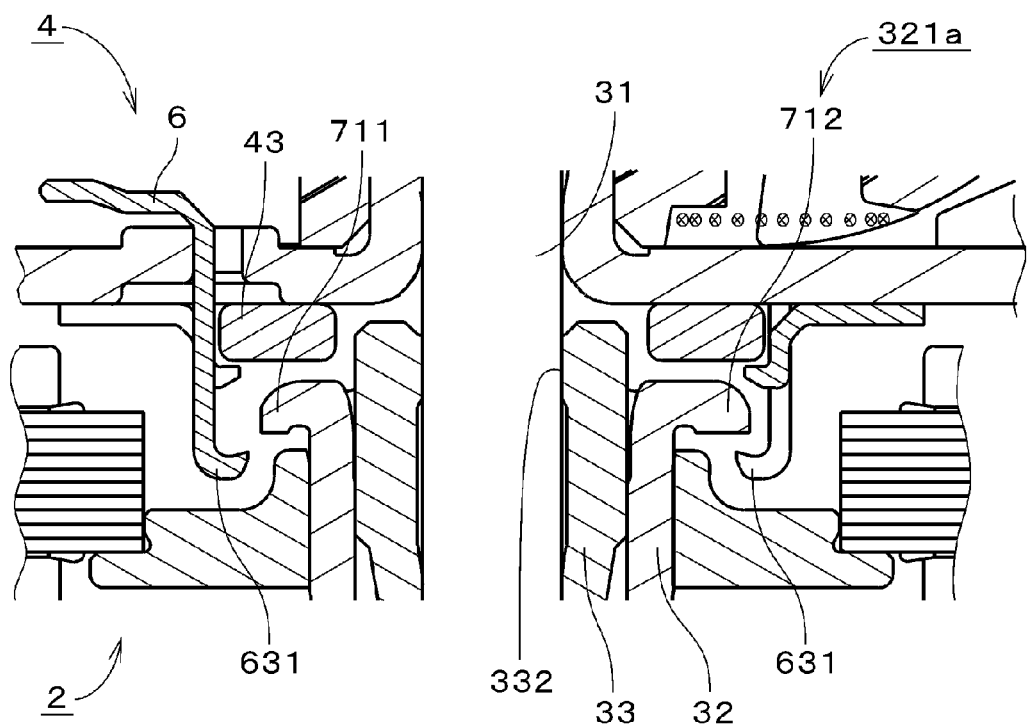
FIG. 19 is a section view showing a motor.

In the motor 1, two of the removal-preventing portions 631 make contact with the increased width extension 712 of the flange portion 321a if the rotary unit 4 shown in FIG. 19 is moved upwards. The remaining one of the removal-preventing portions 631 is positioned outside the reduced width extension 711 and does not make contact with the flange portion 321a. Since the three removal-preventing portions 631 are equally spaced apart in the circumferential direction as shown in FIG. 18, the contact positions where the increased width extension 712 makes contact with the two removal-preventing portions 631 exist within the range less than 180 degrees about the center axis J1. If the range of existence of the contact positions, i.e., the range within which the upward movement of the rotary unit 4 is restrained by the removal-preventing member 6, is set less than 180 degrees as mentioned above, the entire rotary unit 4 is a little inclined so that the portion of the removal-preventing member 6 near the reduced width extension 711 can face upwards.

As a result, the shaft 31 shown in FIG. 19 makes strong contact with the inner surface 332 of the sleeve 33, thus generating a friction force between the shaft 31 and the sleeve 33. This makes it possible to increase the removal force required in removing the removal-preventing member 6 from the bush 32 in the motor 1.

Figure 20:
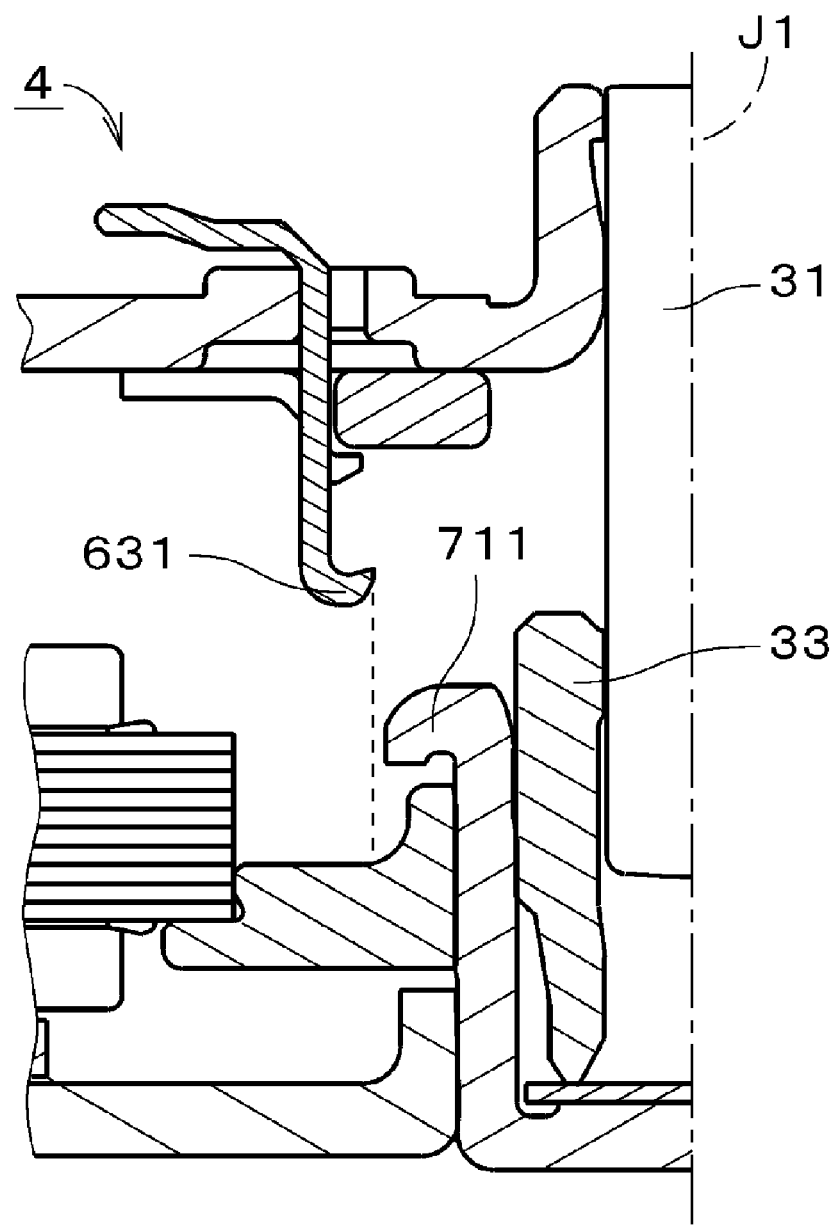
FIG. 20 is a section view of the rotary unit, the stationary unit and the bearing mechanism.

When the shaft 31 is inserted into the sleeve 33 during the fabrication process of the motor 1, the rotary unit 4 is pressed downwards as shown in FIG. 20 in a state that the rotary unit 4 is fixed by a jig to have the center axis J1 extend precisely in the vertical direction. At this time, one of the three removal-preventing portions 631 passes through the reduced width extension 711 without making contact therewith.

Referring back to FIG. 19, the radial width of the reduced width extension 711 is smaller than that of the increased width extension 712 in the flange portion 321a. Therefore, the magnetic attraction force per unit circumferential length acting between the pre-compression magnet 43 and the reduced width extension 711 is smaller than the magnetic attraction force acting between the pre-compression magnet 43 and the increased width extension 712. During rotation of the motor 1, a so-called lateral pressure, i.e., a force acting to incline the shaft 31 toward the increased width extension 712 is generated between the flange portion 321a and the pre-compression magnet 43. In particular, during low-speed rotation of the motor 1, the lateral pressure keeps the shaft 31 inclined in a specified direction with respect to the stationary unit 2. This helps prevent the motor 1 from undergoing rotational vibration during its low-speed rotation.

Although the fourth preferred embodiment has been described above, the shaft 31 cannot be inclined in a specified direction by, e.g., magnetizing only one half of the pre-compression magnet or changing the shape of the pre-compression magnet in the circumferential direction. This is because the pre-compression magnet rotates together with the rotary unit carrying the same. In the motor 1 of the present preferred embodiment, however, the lateral pressure acting to incline the shaft 31 in a specified direction can be easily generated by changing the radial width of the flange portion 321a along the circumferential direction, namely by making non-uniform the radial width of the flange portion 321a along the circumferential direction.

Moreover, since the contact positions of the removal-preventing portions 631 and the flange portion 321a are eccentrically located within the range less than 180 degrees, there is generated a so-called overturning moment that inclines the shaft 31 when an upwardly acting force is applied to the rotary unit 4. As a consequence, it is possible to increase the removal force and to enhance the insertion-removal ratio. In the motor 1, the force required in inserting the shaft 31 into the sleeve 33 can be reduced by enhancing the insertion-removal ratio. Hereinafter, the force required in inserting the shaft 31 into the sleeve 33 will be referred to as "insertion force".

Reduction in the insertion force helps reduce the impact applied to the thrust plate 35 by the shaft 31 in the course of inserting the shaft 31 into the sleeve 33, thereby preventing occurrence of damage in the thrust plate 35. The reduction in the insertion force also helps reduce the impact applied to the bottom portion 322 of the bush 32, consequently preventing rotational vibration of the shaft 31 which would be caused by the deformation of the bottom portion 322. In addition, the reduction in the insertion force helps reduce the impact applied to the respective components of the rotary unit 4 during the insertion process and also assists in reducing the influence on the assembling accuracy of the respective components of the motor 1. This leads to an improvement in the productivity of the motor 1.

In the fourth preferred embodiment, the removal-preventing member 6 may be provided with four or more removal-preventing portions 631. In this case, the circumferential extension range of the reduced width extension 711 is set so that at least two of the removal-preventing portions 631 can be positioned outside the reduced width extension 711. This ensures that, when the shaft 31 is inserted into the sleeve 33, at least two of the removal-preventing portions 631 pass through the flange portion 321a without making contact therewith. The lateral pressure can be generated even when only one of the removal-preventing portions 631 is positioned outside the reduced width extension 711.

The increased width extension 712 is designed to overlap with only the removal-preventing portion 631 existing within the range less than 180 degrees about the center axis J1. If an upwardly-acting force is applied to the rotary unit 4, the increased width extension 712 comes into contact with some of the removal-preventing portions 631. The rotary unit 4 is slightly inclined to thereby generate a friction force between the shaft 31 and the sleeve 33. This makes it possible to increase the removal force and to enhance the insertion-removal ratio.

Figure 21:
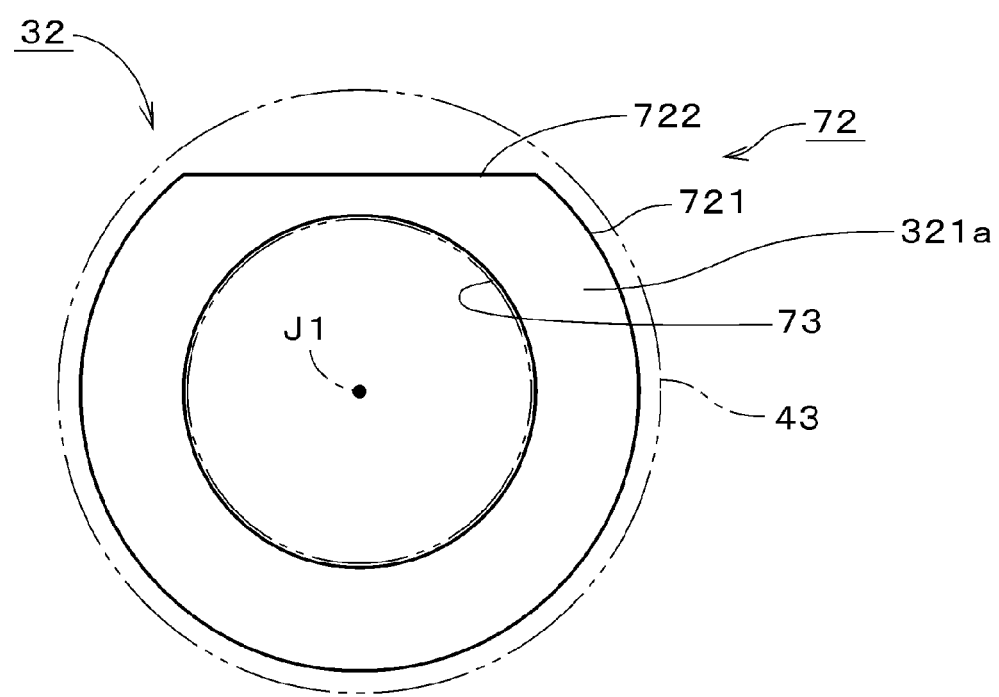
FIG. 21 is a view showing an additional example of the bush.

FIG. 21 is a plan view showing an additional example of the bush 32. In FIG. 21, the pre-compression magnet 43 is indicated by double-dot chain lines. When seen in a plan view, the radial outer edge 72 of the flange portion 321a preferably includes a first outer edge 721 and a second outer edge 722. The first outer edge 721 has an arc shape concentric with the center axis J1. The second outer edge 722 has a straight shape joining the opposite ends of the first outer edge 721. The flange portion 321a can be cost-effectively and easily produced by a press work.

In the flange portion 321a, the radial width between the radial inner edge 73 and the second outer edge 722 gets smaller toward the medial point of the second outer edge 722. Thanks to this feature, the magnetic attraction force per unit circumferential length between the flange portion 321a and the pre-compression magnet 43 becomes smallest near the medial point of the second outer edge 722. During rotation of the motor 1, a lateral pressure is generated to incline the shaft 31 toward the opposite side from the second outer edge 722 of the flange portion 321a. In particular, during low-speed rotation of the motor 1, the shaft 31 is kept inclined in a specified direction. This helps prevent the motor 1 from undergoing rotational vibration during its low-speed rotation, as in the motor 1 shown in FIG. 19.

Fifth Preferred Embodiment

Figure 22:
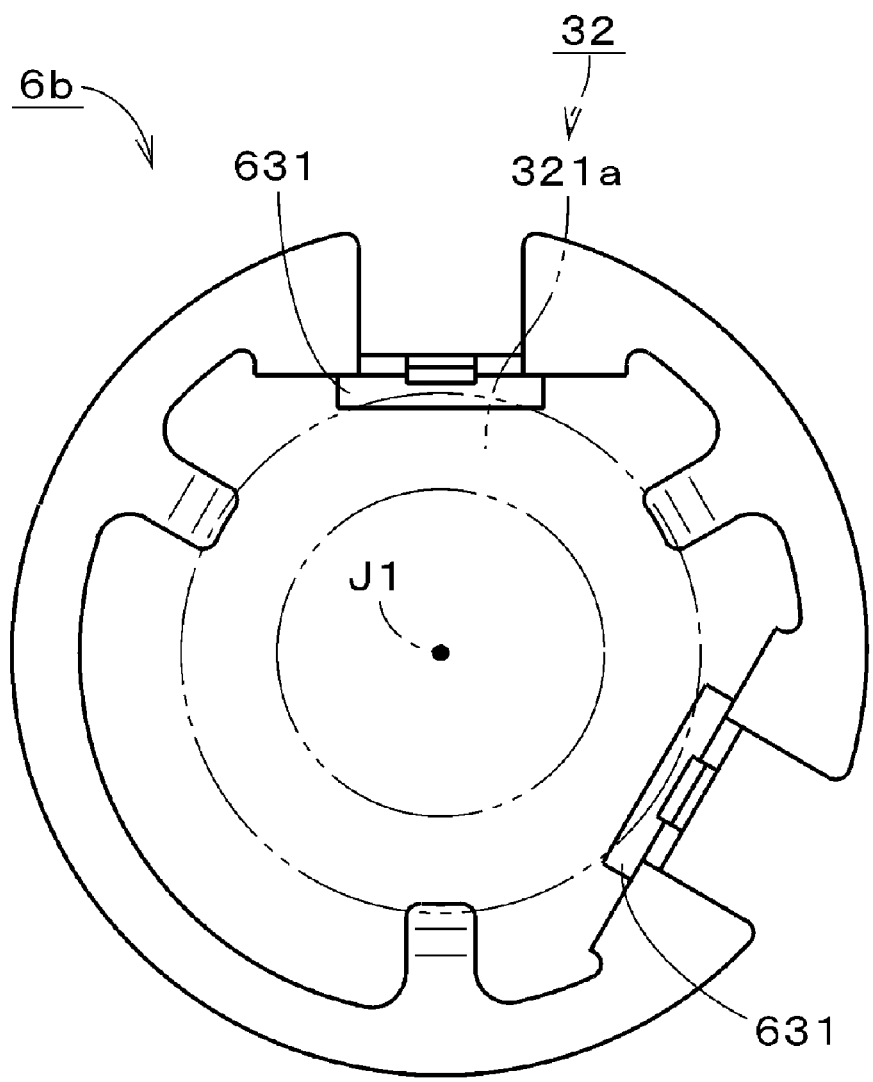
FIG. 22 is a plan view showing the removal-preventing member of a motor according to a fifth preferred embodiment.

FIG. 22 is a view showing the removal-preventing member 6b employed in a motor according to a fifth preferred embodiment. In FIG. 22, the flange portion 321a of the bush 32 is indicated by double-dot chain lines. In the removal-preventing member 6b, the third removal-preventing portion 631c is omitted among the first through third removal-preventing portions 631a, 631b and 631c shown in FIG. 18. When seen in a plan view, the shape of the removal-preventing member 6b is asymmetrical with respect to the center axis J1. In the removal-preventing member 6b, the removal-preventing portions 631 exist within the range less than 180 degrees about the center axis J1. Other shapes of the removal-preventing member 6b remain the same as the corresponding shapes of the removal-preventing member 6. In addition, other structures of the motor according to the fifth preferred embodiment remain the same as the corresponding structures of the motor according to the first preferred embodiment.

If an upwardly-acting force is applied to the rotary unit 4 shown in FIG. 2, the rotary unit 4 is slightly inclined so that the portion of the removal-preventing member 6 in which the removal-preventing portions 631 do not exist, namely the left lower portion of the removal-preventing member 6 in FIG. 22, can move upwards in the direction of the center axis J1. The shaft 31 shown in FIG. 3 makes contact with the inner surface 332 of the sleeve 33, thereby generating a friction force. This makes it possible to increase the removal force and to enhance the insertion-removal ratio. As a result, it becomes possible to perform a design for reduction of the insertion force.

In the fifth preferred embodiment, the number of the removal-preventing portions 631 may be other number than two. The rotary unit 4 can be inclined if at least one removal-preventing portion 631 exist below the flange portion 321a within the range less than 180 degrees about the center axis J1. In the fifth preferred embodiment, if an upwardly-acting force is applied to the rotary unit 4, all the removal-preventing portions 631 make contact with the flange portion 321a at all times. This makes it possible to keep the removal force constant. In the removal-preventing member 6b, the unbalance in the weight thereof may be eliminated by increasing the radial width of the portion of the removal-preventing member 6b in which the removal-preventing portions 631 do not exist.

While certain preferred embodiments of the present invention have been described above, the present invention is not limited to the foregoing embodiments but may be modified in many different forms.

Figure 23:
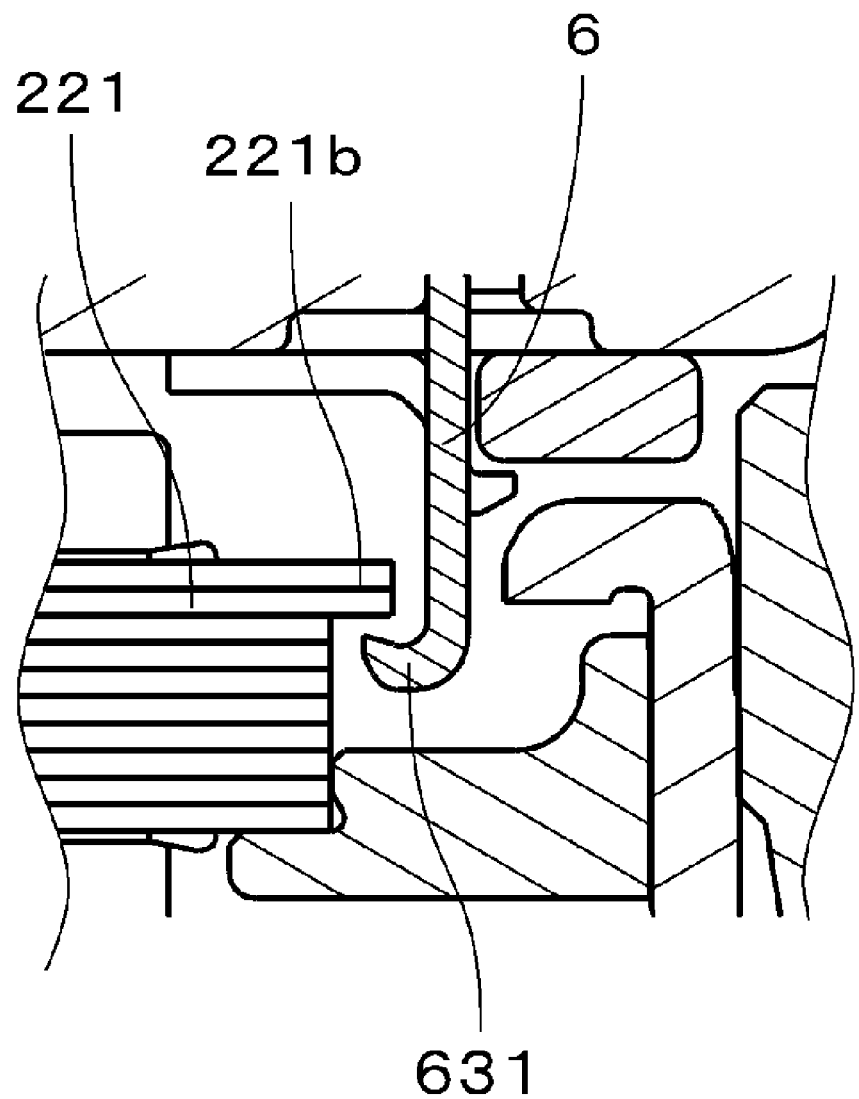
FIG. 23 is a view showing an additional example of the removal-preventing member.

In the first preferred embodiment, for example, the removal-preventing portions 631 of the removal-preventing member 6 may be formed to face radially outwards as shown in FIG. 23. In the stator core 221, there may be formed protrusions 221b protruding radially inwards. Removal prevention is performed by positioning the removal-preventing portions 631 below and near the protrusions 221b. In the motor 1, as set forth above, the removal-preventing portions 631 are positioned below and near a portion of the stationary unit 2 or a portion of bearing mechanism 3 fixed to the stationary unit 2. This makes it possible to perform removal prevention of the rotary unit 4 with respect to the stationary unit 2.

The contact positions between the removal-preventing portions 631 and the protrusions 221b in case of applying an upwardly-acting force to the rotary unit 4 may be brought within the range less than 180 degrees by changing the circumferential distance between the tip ends of the protrusions 221b and the center axis J1. This makes it possible to incline the rotary unit 4 and to increase the removal force using the friction force generated between the shaft 31 and the sleeve 33. Alternatively, the rotary unit may be inclined by providing the removal-preventing portions 631 within the range less than 180 degrees. This holds true in the second and third preferred embodiments.

In the first preferred embodiment, the slant portion 621a of each of the upper protrusions 621 shown in FIG. 12 may be inclined radially outwards and upwards. In this case, the slant portion 621a makes slidable contact with the radial inner extension of the lower edge 414b and moves upwards as the removal-preventing member 6 is inserted into the through-holes 414 of the disk mounting portion 411. Then, the lower portion 621c of each of the upper protrusions 621 makes contact with the radial inner extension of each of the through-holes 414, thereby fixing the radial position of the removal-preventing member 6.

Figure 24:
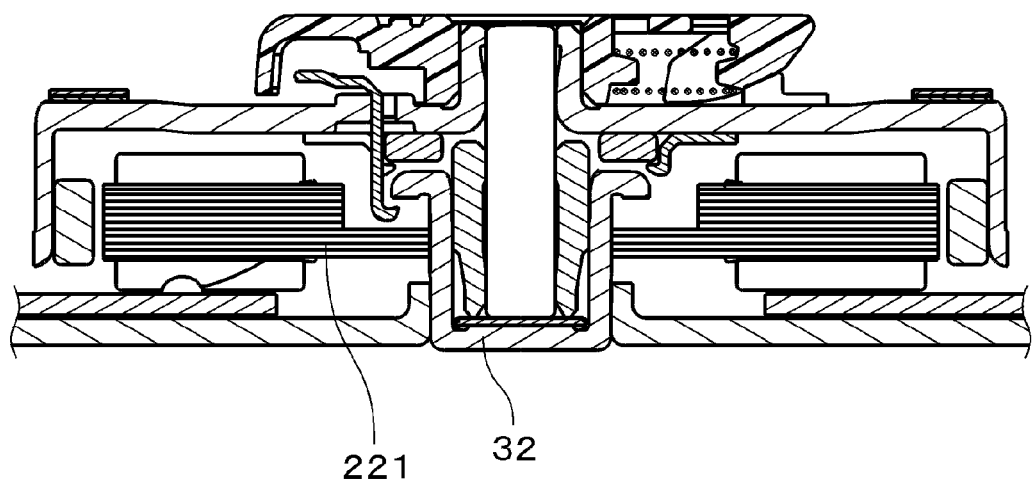
FIG. 24 is a section view showing an additional example of the stator.

In the foregoing preferred embodiments, the stator core 221 may be directly fixed to the outer periphery of the bush 32 as shown in FIG. 24 by omitting the stator holding member 23 and causing a portion of the inner end of the stator core 221 to protrude radially inwards.

In the first preferred embodiment, each of the upper protrusions 621 makes contact with only the upper edge of each of the through-holes 414. Alternatively, the surface of the lower portion 621c of each of the upper protrusions 621 opposing to the disk mounting portion 411 may make contact with the upper surface of the disk mounting portion 411. In case where other components of the motor 1 are fixed to the upper surface of the disk mounting portion 411, the upper protrusions 621 may make contact with the components from above and, consequently, may make indirect contact with the upper surface of the disk mounting portion 411. This holds true in the second preferred embodiment. In case where other components of the motor 1 are attached to around the upper protrusions 622, the upper protrusions 622 may be thermally crushed against the components to make indirect contact with the upper surface of the disk mounting portion 411.

Similarly, the lower fixing portion 61 may make indirect contact with the lower surface of the disk mounting portion 411. For example, the lower fixing portion 61 may make contact with the lower surface of the pre-compression magnet 43 in case where the lower fixing portion 61 is positioned radially inwards of the upper fixing portion 62 and the lower protrusions 63.

The number of the upper protrusions 621 or 622 and the number of the lower protrusions 63 may be other number than three. In the first preferred embodiment, it is preferable that three or more lower protrusions 63 are provided in an equal interval along the circumferential direction to prevent radial movement of the pre-compression magnet 43. An annular lower protrusion 63 may be provided in the second preferred embodiment.

The upper protrusions 621 or 622 and the lower protrusions 63 may differ in number from each other. In this case, it will be all right in the first preferred embodiment if one of the upper protrusions 621 is arranged in the same circumferential position as one of the lower protrusions 63.

In the first, second, third and fifth preferred embodiments, the pre-compression magnet 43 may be arranged on the upper surface of the flange portion 321a. That is to say, the flange portion 321a may be used as a yoke so that a magnetic action occurs between the pre-compression magnet 43 and the disk mounting portion 411. In other words, at least one of the disk mounting portion 411 and the bush 32 of the motor 1 is made of a magnetic material and the pre-compression magnet 43 is arranged in an opposing relationship with the other. This eliminates the need to additionally provide a magnetic member in an opposing relationship with the pre-compression magnet 43.

Figure 25:
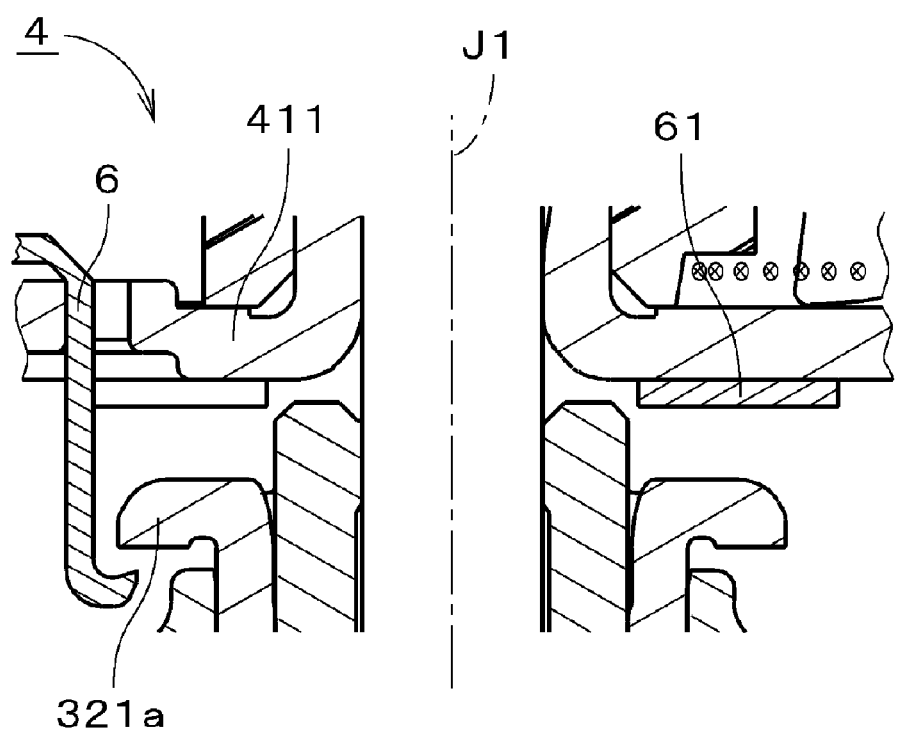
FIG. 25 is a view showing an additional example of the rotary unit.

The pre-compression magnet 43 may be arranged in a position farther away from the center axis J1 than shown in FIG. 2. In this case, a magnetic action occurs between the pre-compression magnet 43 and the stationary unit 2, e.g., between the pre-compression magnet 43 and the stator core 221. In the rotor yoke 41, the annular rubber piece 44 lying on the disk mounting portion 411 may be omitted so that the storage disk 9 can be directly mounted on the upper surface of the disk mounting portion 411. In case where the pre-compression magnet 43 is omitted from the rotary unit 4, the lower fixing portion 61 may be positioned between the flange portion 321a and the disk mounting portion 411 as illustrated in FIG. 25. This makes it possible to fix the removal-preventing member 6 to the disk mounting portion 411 without having to increase the size of the motor 1 in the direction of the center axis J1.

In the foregoing preferred embodiments, the thrust plate 35 is provided to form a resin layer between the internal bottom surface of the bottom portion 322 of the bush 32 and the tip end of the shaft 31. Alternatively, the resin layer may be formed by coating at least one of the internal bottom surface of the bottom portion 322 and the tip end of the shaft 31 with a resin.

In the foregoing preferred embodiments, even if the upper end of the bush 32 is positioned at the same elevation as the upper end of the stator 22, the pre-compression magnet 43 can be arranged between the bush 32 and the disk mounting portion 411 without increasing the size of the motor 1 in the direction of the center axis J1. The chucking device 5 may have a structure in which the claw members 52 are movable in one of the vertical direction and the radial direction.

As long as the through-holes 414 are arranged between the claw members 52 along the circumferential direction, it is not always necessary that the through-holes 414 and the claw members 52 exist alternately in the circumferential direction. Even if the claw members 52 do not make sliding contact with the disk mounting portion 411, the physical interference between the claw members 52 and the upper protrusions 621 can be easily prevented by arranging the through-holes 414 between the claw members 52 along the circumferential direction. The motor 1 may be an inner-rotor type in which a rotor magnet is arranged inside a stator. A disk mounting portion may be independently provided above the rotor yoke.

INDUSTRIAL APPLICABILITY

The present invention is particularly suitable for use as a low-profile motor in a storage disk drive apparatus. However, the present invention is not limited to this application but may be used as a motor for other devices than the storage disk drive apparatus, e.g., as a fan motor.

While various preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor of a disc drive, comprising:
a bearing mechanism;
a stationary unit including a stator arranged radially outwards of the bearing mechanism; and
a rotary unit supported by the bearing mechanism at the upper side of the stationary unit for rotation about a center axis with respect to the stationary unit,
wherein the rotary unit includes a substantially cylindrical closed-top rotor yoke having a cover portion arranged to cover the stator, the bearing mechanism including a substantially cylindrical closed-bottom bush formed by a press work, a sleeve fixed inside the bush and provided with an upper portion protruding beyond the bush and a shaft inserted into the sleeve, an upper end of the bush being lower than or flush with an upper end of the stator in a direction parallel to the center axis.

2. The motor of claim 1, wherein the cover portion of the rotor yoke serves as a disk mounting portion on which a storage disk is mounted.

3. The motor of claim 1, wherein one of the cover portion of the rotor yoke and the bush is formed of a magnetic material, and further comprising a pre-compression magnet arranged on the other of the cover portion and the bush in an opposing relationship with one of the cover portion and the bush.

4. The motor of claim 3, further comprising a removal-preventing member arranged in the cover portion of the rotor yoke to prevent removal of the rotary unit from the stationary unit, the removal-preventing member including a removal-preventing portion provided between the stator and the bush and positioned below and near a portion of the stationary unit or the bearing mechanism.

5. The motor of claim 4, wherein the pre-compression magnet being attached to a lower surface of the cover portion, the removal-preventing member including a plurality of detachment-preventing portions bent toward below the pre-compression magnet.

6. The motor of claim 4, wherein the bush includes a flange portion protruding radially outwards, the flange portion being positioned near the removal-preventing portion.

7. The motor of claim 4, wherein the stator includes a stator core having a radial inner upper end, the removal-preventing portion being positioned lower than the radial inner upper end of the stator core of the stator.

8. The motor of claim 4, wherein the stator includes a coil, the cover portion including a lower surface, the removal-preventing member further including a contact portion making contact with the lower surface of the cover portion, the contact portion being positioned radially inwards of the coil of the stator.

9. The motor of claim 1, wherein the bush is made of a magnetic material, the bush including an upper portion and a flange portion protruding radially outwards from the upper portion, the rotary unit further including a pre-compression magnet arranged on a lower surface of the cover portion to overlap with the flange portion in the direction parallel to the center axis, the flange portion having a radial width changing in a circumferential direction, the motor configured to ensure that a force for inclining the shaft in a specified direction with respect to the stationary unit is generated between the flange portion and the pre-compression magnet during rotation of the rotary unit.

10. The motor of claim 1, wherein the bush includes an upper portion and a flange portion protruding radially outwards from the upper portion, and further comprising a removal-preventing member arranged in the cover portion of the rotor yoke to prevent removal of the rotary unit from the stationary unit, the removal-preventing member including at least one removal-preventing portion lying below the flange portion and existing within a range less than 180 degrees about the center axis.

11. The motor of claim 1, wherein the bush includes an upper portion and a flange portion protruding radially outwards from the upper portion, the flange portion having a radial width changing in a circumferential direction, and further comprising a removal-preventing member arranged in the cover portion of the rotor yoke to prevent removal of the rotary unit from the stationary unit, the removal-preventing member including a plurality of removal-preventing portions positioned below the flange portion, the motor configured to ensure that, when the rotary unit is moved upwards, only a limited number of the removal-preventing portions make contact with the flange portion in contact positions falling within a range less than 180 degrees about the center axis.

12. The motor of claim 10, wherein the shaft being supported in an axial direction by making contact with an internal bottom surface of the bush through a resin layer.

13. The motor of claim 1, further comprising an annular stator holding member arranged on an outer surface of the bush, the stator being provided in an outer periphery of the stator holding member.

14. The motor of claim 1, wherein an inner surface of the sleeve has an intermediate area depressed radially outwards, and an outer surface of the sleeve is shaped to leave a gap between a lower area thereof and the inner surface of the bush.

15. The motor of claim 3, wherein the pre-compression magnet is arranged in an axially overlapping relationship with the sleeve.

16. The motor of claim 4, further comprising a stator holding member attached to an outer surface of the bush, the stator being fixed to the bush through the stator holding member, the stator holding member including an upper portion axially overlapping with the removal-preventing member.

17. A storage disk drive apparatus, comprising:
the motor of claim 1 arranged to rotate a storage disk;
an access unit arranged to perform a task of reading and/or writing information with respect to the storage disk; and
a housing arranged to accommodate the motor and the access unit.

* * * * *